US008174439B2

(12) United States Patent
Torimoto et al.

(10) Patent No.: US 8,174,439 B2
(45) Date of Patent: May 8, 2012

(54) POSITION INFORMATION PROVIDING SYSTEM INDOOR TRANSMITTER AND METHOD FOR PROVIDING POSITION INFORMATION

(75) Inventors: Hideyuki Torimoto, Shinjuku-ku (JP); Kazuki Okano, Shinjuku-ku (JP); Satoshi Kogure, Tsukuba (JP)

(73) Assignee: GNSS Technologies Inc., Tokyo (JP)

( * ) Notice: Subject to any disclaimer, the term of this patent is extended or adjusted under 35 U.S.C. 154(b) by 0 days.

(21) Appl. No.: 12/681,543

(22) PCT Filed: Oct. 2, 2008

(86) PCT No.: PCT/JP2008/067945
§ 371 (c)(1),
(2), (4) Date: Jul. 9, 2010

(87) PCT Pub. No.: WO2009/044819
PCT Pub. Date: Apr. 9, 2009

(65) Prior Publication Data
US 2010/0290504 A1   Nov. 18, 2010

(30) Foreign Application Priority Data
Oct. 3, 2007   (JP) ................................ 2007-259903

(51) Int. Cl.
*G01S 19/11* (2010.01)
(52) U.S. Cl. ................................. 342/357.48
(52) U.S. Cl. ............................................................
(58) Field of Classification Search ................ 342/357.8
See application file for complete search history.

(56) References Cited

U.S. PATENT DOCUMENTS

| 5,583,513 | A  | * | 12/1996 | Cohen ....................... 342/357.42 |
| 6,590,524 | B1 | * | 7/2003 | Farley et al. ............. 342/357.48 |
| 2004/0132421 | A1 |   | 7/2004 | Underbrink |
| 2006/0250303 | A1 | * | 11/2006 | Thiel et al. ............... 342/357.06 |
| 2007/0109188 | A1 | * | 5/2007 | Zimmerman et al. ... 342/357.14 |
| 2007/0257831 | A1 | * | 11/2007 | Mathews et al. ................. 342/22 |

FOREIGN PATENT DOCUMENTS

| JP | 2004-132750 A | * | 4/2004 |
| JP | 2004-132750 A |   | 4/2004 |

(Continued)

OTHER PUBLICATIONS

International Search Report issued in PCT/JP2008/067945, mailed on Jan. 13, 2009, with translation, 4 pages.

(Continued)

*Primary Examiner* — Thomas Tarcza
*Assistant Examiner* — Frank J. McGue
(74) *Attorney, Agent, or Firm* — Osha Liang LLP

(57) ABSTRACT

An indoor transmitter is capable of programmably changing a format of a transmitter signal. A process to be performed by a position information providing apparatus comprises the step of acquiring a received positioning signal, and the step of identifying an emission source of the positioning signal, wherein, if the emission source of the positioning signal is an outdoor source, the process further comprises the step of acquiring a navigation message included in the positioning signal, and the step of performing a processing for calculating a position based on the signal, or, if the emission source of the positioning sign is an indoor source, the process further comprises the step of acquiring message data from the positioning signal, the step of acquiring coordinate values from the data, and the step of displaying position information based on the coordinate values.

19 Claims, 19 Drawing Sheets

FOREIGN PATENT DOCUMENTS

| | | | | |
|---|---|---|---|---|
| JP | 2005-043193 A | * | 2/2005 | |
| JP | 2005-043193 A | | 2/2005 | |
| JP | 2005-077172 A | | 3/2005 | |
| JP | 2005-077172 A | * | 3/2005 | |
| JP | 2007-170856 A | * | 7/2005 | |
| JP | 2006-067086 A | | 3/2006 | |
| JP | 2006-118998 A | | 5/2006 | |
| JP | 2006-118998 A | * | 5/2006 | |
| JP | 2006-177904 A | | 7/2006 | |
| JP | 2006-177904 A | * | 7/2006 | |
| JP | 3921086 B2 | | 2/2007 | |
| JP | 2007-121226 A | | 5/2007 | |
| JP | 2007-121226 A | * | 5/2007 | |
| JP | 3921086 B2 | * | 5/2007 | |
| JP | 2007-170956 A | | 7/2007 | |
| WO | WO 03/040752 A1 | * | 5/2003 | |

OTHER PUBLICATIONS

Written Opinion issued in PCT/JP2008/067945, mailed on Jan. 13, 2009, 4 pages.

* cited by examiner

Fig.19

| RECORD NO. 1510 | TRANSMITTER NO. 1520 | INSTALLATION COORDINATES 1530 | INSTALLATION SITE NAME 1540 | ADDRESS 1550 |
|---|---|---|---|---|
| 001 | 01 | LATITUDE 35 DEGREE 41 MINUTE 687 SECOND NORTH<br>LONGITUDE 139 DEGREE 42 MINUTE 482 SECOND EAST<br>ALTITUDE 100 m | GT COMPANY | SINJUKU, TOKYO ... |
| 002 | 02 | ... | ... | ... |
| 003 | 03 | ... | ... | ... |
| ... | ... | ... | ... | ... |

1450

POSITION INFORMATION PROVIDING SYSTEM INDOOR TRANSMITTER AND METHOD FOR PROVIDING POSITION INFORMATION

TECHNICAL FIELD

The present invention relates to a technique for providing position information. More specifically, the present invention relates to a technique capable of providing position information even under an environment impeding the penetration of a signal emitted from a satellite which emits a positioning signal.

BACKGROUND ART

As a conventional position determination system, a GPS (Global Positioning System) is known. A satellite for emitting a signal for use in the GPS (the satellite and the signal will hereinafter be referred to respectively as "GPS satellite" and "GPS signal") is flying at an attitude of about twenty thousand km from the ground. Any user is allowed to receive the signal emitted from the GPS satellite so as to measure a distance between the GPS satellite and the user through demodulation of the received signal. Thus, as long as there is no obstacle between the ground and the GPS satellite, position determination can be performed using the signal emitted from the GPS satellite. However, in cases where the GPS is used, for example, in an urban area, a forest of buildings often becomes obstacle to cause a situation where a position information providing apparatus of a user cannot receive the signal emitted from the GPS satellite. Further, depending on conditions, a signal diffraction or reflection often occurs due to the buildings to cause an error in distance measurement using the signal, which leads to deterioration in accuracy of position determination.

Although there is a technique of receiving in an indoor area a weak GPS signal which has penetrated through a wall or roof, a receiving state is still unstable, which causes deterioration in accuracy of position determination.

While the above description has been made about position determination by taking the GPS as an example, the aforementioned phenomena are observed in a satellite-based positioning system in general. As used herein, the term "satellite-based positioning system" means any type of satellite-based positioning system including GLONASS (GLObal NAvigation Satellite System) in Russian Federation, and Galileo in Europe, as well as the GPS.

A technique related to a position information providing system is disclosed, for example, in JP 2006-67086A (Patent Publication 1).

Patent Publication 1: JP 2006-67086A

DISCLOSURE OF THE INVENTION

Problem to be Solved by the Invention

However, in a technique disclosed in the JP 2006-67086A, there is a problem that it lacks versatility, because a reader or a writer is unique as an element of a position information providing system. Moreover, due to a need for limiting a transmitter output to avoid interference, a receivable range for position information is restricted, which causes a problem that it is unable to continuously acquire position information, or an extremely large number of transmitters are required to cover a wide range.

In regard to acquisition or notification of position information, for example, in a fixed-line phone, a caller position can be identified by a call sent out from the fixed-line phone, because an installation location thereof is preliminarily known. However, along with popularization of mobile phones, mobile communications have become popular more and more. Thus, it often becomes unable to notify caller position information in the same manner as that in the fixed-line phone. Further, as to a message in an emergency, the development of laws toward including position information in a message from a mobile phone is being promoted.

In a conventional mobile phone having a position determination function, position information can be acquired in a location where it is possible to receive a signal from a satellite, so that a position of the mobile pone can be notified. However, in a location where it is impossible to receive radio waves, such as an inside area of a building or an underground shopping area, there is a problem of being unable to acquire position information.

As measures for this problem, for example, a technique is compensated which is designed to arrange in an indoor area a plurality of transmitters each capable of emitting a signal similar to a GPS signal so as to calculate a position based on the trilateration principle as in the GPS. However, in this case, there is a problem of an increase in cost of the transmitters due to a need for allowing respective clock times of the transmitters to be in synchronization with each other.

Moreover, a radio wave propagation becomes complicated due to reflection in the indoor area, which causes another problem that an error of about several tens of meters easily occurs despite such costly transmitters are installed.

The present invention has been made to solve the above problems, and its object is to provide a position information providing system capable of providing position information without deterioration in accuracy even in a location where it is impossible to receive radio waves from a satellite which emits a signal for position determination.

It is another object of the present invention to provide a position information providing system capable of providing position information based on a signal having no need for a clock time synchronization with a clock time of a satellite which emits a signal for position determination.

It is yet another object of the present invention to provide a position information providing system capable of suppressing a cost of a transmitter which emits a signal for position determination.

It is still another object of the present invention to provide a position information providing system capable of facilitating installation a transmitter in an inside area of a building or the like and maintenance thereof.

It is yet still another object of the present invention to provide an indoor transmitter capable of transmitting a position information-providing signal without deterioration in accuracy even in a location where it is impossible to receive radio waves from a satellite which emits a signal for position determination.

It is another further object of the present invention to provide an indoor transmitter capable of transmitting a position information-providing signal based on a signal having no need for a clock time synchronization with a clock time of a satellite which emits a signal for position determination.

It is still a further object of the present invention to provide an indoor transmitter capable of facilitating installation and maintenance thereof.

It is an additional object of the present invention to provide a position information providing method capable of providing position information without deterioration in accuracy even in a location where it is impossible to receive radio waves from a satellite which emits a signal for position determination.

It is yet an additional object of the present invention to provide a position information providing method capable of providing position information based on a signal having no need for a clock time synchronization with a clock time of a satellite which emits a signal for position determination.

Means for Solving the Problem

According to a first aspect on the present invention, there is provided a position information providing system capable of providing position information by use of a first positioning signal which is a spread spectrum signal from each of a plurality of satellites. The position information providing system comprises an indoor transmitter and a position information providing apparatus. The indoor transmitter includes a first storage unit which stores therein position data for identifying an installation location of the indoor transmitter, a generation unit for generating, as a spread spectrum signal, an second positioning signal which is an quadrature-modulated signal having the position data, and a transmitting unit for transmitting the generated spread spectrum signal. The position information providing apparatus includes a receiving unit for receiving a spread spectrum signal, a second storage unit which stores therein a plurality of code patterns related to the first and second positioning signals, an identifying unit for identifying one of the code patterns which corresponds to the spread spectrum signal received by the receiving unit, a determining unit for, based on a signal obtained by demodulating the received spread spectrum signal using the code pattern identified by the identifying unit, determining which of the first and second positioning signals is received, a position information-deriving unit for deriving position information of the position information providing apparatus, while switching between processing modes depending on a result of the determination, and an output unit for outputting the position information derived by the position information-deriving unit. In the position information providing system, the position data includes first data capable of identifying the indoor transmitter, and second data indicative of the installation location of the indoor transmitter. Further, the generation unit is operable to generate, as the second positioning signal, a first phase signal having the first data after being subjected to quadrature modulation, and a second phase signal having the second data after being subjected to quadrature modulation.

Preferably, the position information-deriving unit is operable, when the second positioning signal transmitted by the indoor transmitter which is one of a plurality of indoor transmitters, is received, to acquire the position data from the signal obtained by the demodulation, and, when a plurality of the first positioning signals are received, to calculate the position information based on respective spread spectrum signals of the plurality of received first positioning signals.

Preferably, the position information providing apparatus is adapted to be capable of communicating with a communication apparatus for providing position information associated with the first data, and the position information-deriving unit is operable, when the receiving unit receives the second positioning signal, to communicate with the communication apparatus based on the first data included in the first phase signal to acquire position information associated with the first data.

Preferably, the indoor transmitter further includes a plurality of digital filters, and a selection unit for selecting one of the plurality of digital filters, wherein the generation unit is operable to generate, as a spread spectrum signal, the second positioning signal having the position data, depending on a band defined by the digital filter selected by the selection unit.

Preferably, the position information-deriving unit is operable, when the receiving unit receives the second positioning signal, to extract the second data from the second phase signal, and the output unit is operable to display the installation location based on the extracted second data.

Preferably, the second positioning signal includes a first phase signal and a second phase signal, wherein the first phase signal includes first data capable of identifying the indoor transmitter, and the second phase signal includes second data indicative of the installation location of the indoor transmitter, and wherein the generation unit is operable to perform modulation of the first phase signal and modulation of the second phase signal independently.

Preferably, the first storage unit is adapted to store therein spread code data for spectral spreading, and the indoor transmitter further includes a data input unit adapted to accept an input of the spread code data, and write the accepted spread code data in the first storage unit, and wherein the generation unit is operable to generate the second positioning signal as a spread spectrum signal, based on the spread code data input from an outside of the indoor transmitter.

Preferably, the generation unit is a logic circuit which is programmable according to firmware supplied from the outside.

Preferably, the second positioning signal shares a common format with the first positioning signal, and includes the position data in place of a navigation message included in the first positioning signal, and the position information-deriving unit of the position information providing apparatus includes a calculation unit which is operable, when a plurality of the first positioning signals are received, to calculate a position of the position information providing apparatus based on the navigation messages of the first positioning signals.

Preferably, the position data is configured to identify a position of the indoor transmitter only by itself, and the output unit is operable to output the position information derived from the position data in the form of an image indicative of a determined position.

According to a second aspect of the present invention, there is provided an indoor transmitter capable of providing position information by use of a first positioning signal which is a spread spectrum signal from each of a plurality of satellites, and a second positioning signal having the same data format as that of the first positioning signal. The indoor transmitter comprises a first storage unit which stores therein position data for identifying an installation location of the indoor transmitter, a generation unit for generating, as a spread spectrum signal, an second positioning signal which is an quadrature-modulated signal having the position data, and a transmitting unit for transmitting the generated spread spectrum signal. In the indoor transmitter, the position data includes first data capable of identifying the indoor transmitter, and second data indicative of the installation location of the indoor transmitter. Further, the generation unit is operable to generate, as the second positioning signal, a first phase signal having the first data after being subjected to quadrature modulation, and a second phase signal having the second data after being subjected to quadrature modulation.

According to a third aspect of the present invention, there is provided a method of providing position information by use of a first positioning signal which is a spread spectrum signal from each of a plurality of satellites. The method comprises the steps of: generating an second positioning signal which is quadrature-modulated, as a spread spectrum signal, based on position data for identifying an installation location of an indoor transmitter; transmitting the generated spread spectrum signal; receiving a spread spectrum signal; identifying, based on a plurality of code patterns related to the first and second positioning signals, one of the code patterns which corresponds to the received spread spectrum signal; determining, based on a signal obtained by demodulating the received spread spectrum signal using the identified code pattern, which of the first and second positioning signals is received; deriving position information, while switching between processing modes depending on a result of the determination; and outputting the derived position information. In the method, the position data includes first data capable of identifying the indoor transmitter, and second data indicative of the installation location of the indoor transmitter. Further, the step of generating includes the sub-step of generating, as the second positioning signal, a first phase signal having the first data after being subjected to quadrature modulation, and a second phase signal having the second data after being subjected to quadrature modulation.

Effect of the Invention

In the present invention, it becomes possible to provide position information without deterioration in accuracy even in a location where it is impossible to receive radio waves from a satellite which emits a signal for position determination.

BRIEF DESCRIPTION OF THE DRAWINGS

FIG. 19 is a diagram conceptually showing one mode of data storage in a hard disk 1450 provided in the information providing server 1230.

EXPLANATION OF CODES

Figure 1:
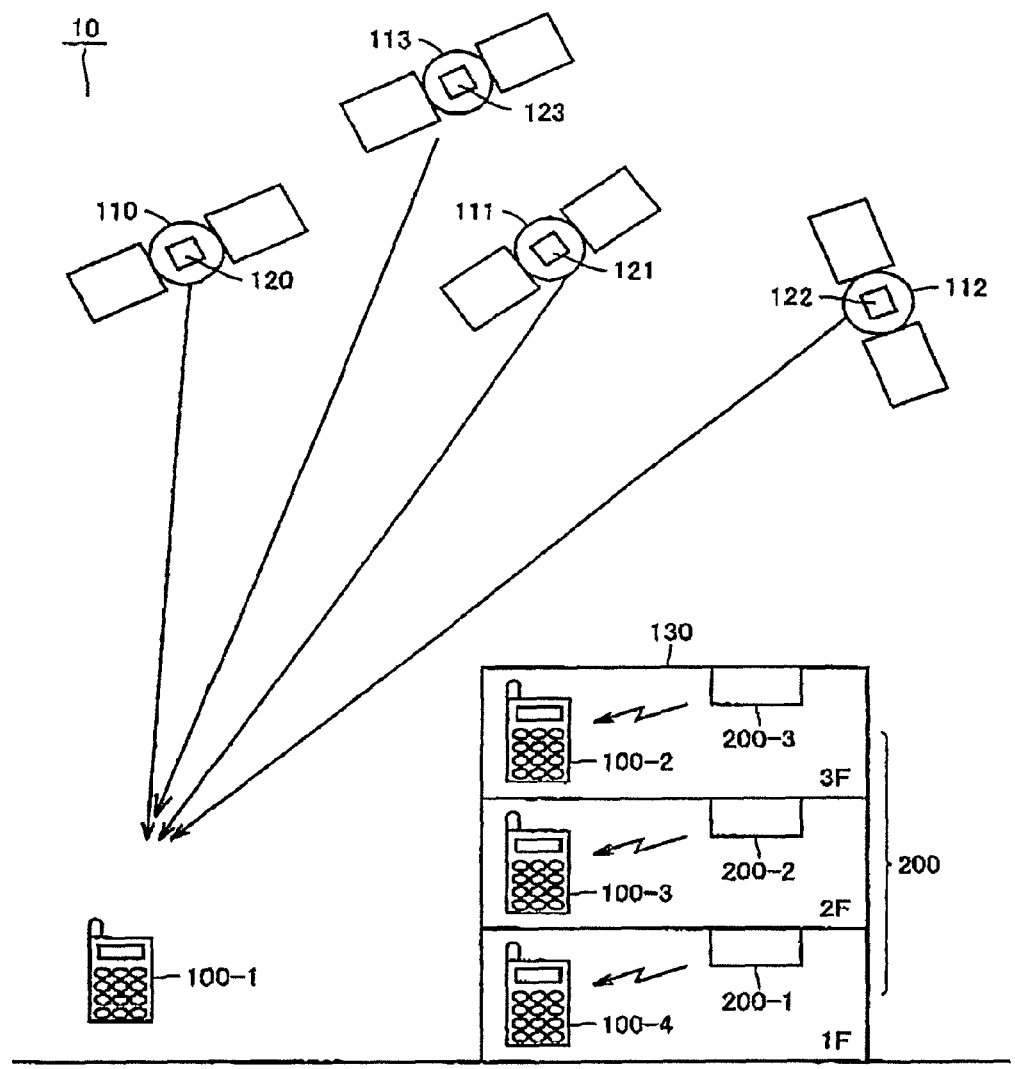
FIG. 1 is a diagram showing a configuration of a position information providing system 10 according to a first embodiment of the present invention.

10: position information providing system
110, 111, 112: GPS satellite
120, 121, 122: transmitter
100-1, 100-2, 100-3, 100-4, 1000, 1160, 1170: position information providing apparatus
130: building
200-1, 200-2, 200-3, 1110, 1120, 1130, 1210: indoor transmitter
210: radio I/F
220: external synchronous link port
221: external clock port
230: reference clock I/O block
240: digital processing block
250: analog block
1010, 1308: antenna
1140, 1150: region
1220: Internet
1380: memory card
1462: CD-ROM

BEST MODE FOR CARRYING OUT THE INVENTION

With reference to the drawings, the present invention will now be described based on an embodiment thereof. In the following description, a common reference numeral or code is assigned to the same elements or components. Such elements or components have the same name and function. Thus, duplicated detained description thereabout will be omitted.

First Embodiment

With reference to FIG. 1, a position information providing system 10 according to a first embodiment of the present invention will be described. FIG. 1 is a diagram showing a configuration of the position information providing system 10. The position information providing system 10 comprises a plurality of GPS (Global Positioning System) satellites 110, 111, 112, 113 each of which emits a signal for position determination (hereinafter referred to as "positioning signal") while flying at an attitude of about twenty thousand km from the ground, and a plurality of position information providing apparatuses 100-1 to 100-4. When each of the position information providing apparatuses 100-1 to 100-4 is generically described, it will be referred to as "position information providing apparatus 100". For example, the position information providing apparatus 100 may be a terminal having a conventional position determination unit.

As used herein, the term "positioning signal (position-determination signal)" means a so-called "spread-spectrum signal", for example, a so-called "GPS signal". However, the positioning signal is not limited to the GPS signal. Although the following description will be made based on one example where the GPS is use as a position determination system, for ease of explanation, the present invention is also applicable to any other satellite-based position determination system (such as the Galileo or the quasi-zenith satellite system).

For example, a center frequency of the positioning signal may be 1575.42 MHz. For example, a spread frequency of the positioning signal may be 1.023 MHz. In this case, a frequency of the positioning signal becomes equal to that of a C/A (Coarse Acquisition) signal in an existing GPS L1 band. Thus, a front-end existing-positioning-signal receiving circuit (e.g., GPS signal receiving circuit) can be diverted, so that it becomes possible to allow the position information providing apparatus 100 to receive the positioning signal, only by changing software for processing a signal from the front-end without adding a new hardware circuit.

The positioning signal may be modulated with a 1.023 MHz rectangular wave. In this case, for example, if a data channel thereof is the same as that of a positioning signal which is newly planned to be transmitted in the L1 band, a user can receive the positioning signal using a receiver capable of receiving and processing the new GPS signal. A frequency of the rectangular wave is preferably 1.023 MHz. A frequency for the modulation is set by trade-off with spectral separation for avoiding interference with other signals.

A transmitter 120 is mounted on the GPS satellite 110 to emit a positioning signal. Further, a transmitter (121, 122, 123) similar to the transmitter 120 is mounted on each of the GPS satellites 111, 112, 113.

Each of the position information providing apparatuses 100-2, 100-3, 100-4 having the same function as that of the position information providing apparatus 100-1 is usable even in a location where it is difficult for radio waves to penetrate, such as a building 130, as described below. In the building 130, an indoor transmitter 200-1 is attached to a ceiling of the 1st floor of the building 130. The position information providing apparatus 100-4 is operable to receive a positioning signal emitted from the indoor transmitter 200-1. In the same manner, two indoor transmitters 200-2, 200-3 are attached to ceilings of the 2nd and 3rd floors of the building 130, respectively. In this case, a clock time of each of the indoor transmitters 200-1, 200-2, 200-3 (the clock time will hereinafter be referred to as "ground clock time") and a clock time of each of the GPS satellites 110, 111, 112, 113 (the clock time will hereinafter be referred to as "satellite clock time") may be independent of each other, i.e., the ground clock time and the satellite clock time are not required to be synchronized with each other. However, the satellite clock times of the GPS satellites are required to be synchronized with each other. Thus, each of the satellite clock times is controlled by an atomic clock mounted on a respective one of the GPS satellites. According to need, the ground clock times as the clock times of the indoor transmitters 200-1, 200-2, 200-3 may be preferably synchronized with each other.

A spread-spectrum signal to be emitted as a positioning signal from each of the transmitters of the GPS satellites is generated by modulating a navigation message with a PRN (Pseudo Random Noise) code. The navigation message includes clock time data, orbit data, almanac data and ionospheric correction data. Each of the transmitters 120 to 123 also holds data (PRN-ID (Identification Data)) for identifying the transmitter (120 to 123) itself or the GPS satellite mounting the transmitter (120 to 123).

The position information providing apparatus 100 has data and a code generator for generating a plurality of types of pseudo random noise codes. The position information providing apparatus 100 is operable, in response to receiving a positioning signal, to perform an after-mentioned demodulation processing, using a code pattern of a pseudo random noise code (pseudo random noise code pattern) assigned to a respective one of the transmitters of the satellites or a respective one of the indoor transmitters, to identify from which of the satellites or the indoor transmitters the received signal is emitted. The PRN-ID is included in data of an L1C signal as one type of the positioning signal, to prevent signal capture/tracking using an erroneous code pattern which is liable to occur when a reception level is low.

[Transmitter Mounted on GPS Satellite]

A configuration of a transmitter to be mounted on a GPS satellite is well known. Thus, only the outline of the configuration of the transmitter mounted on the GPS satellite will be described below. Each of the transmitters 120, 121, 122, 123 comprises an atomic clock, a storage device for storing therein data, an oscillator circuit, a processing circuit for generating a positioning signal, an encoding circuit for subjecting the signal generated by the processing circuit to spread-spectrum encoding, and a transmitting antenna. The storage device stores therein the navigation message including ephemeris data, almanac data of a respective one of the GPS satellites and ionospheric correction data, and the PRN-ID.

The processing circuit is operable to generate an outgoing message, using clock time information from the atomic clock, and the data stored in the storage device.

In the transmitters 120 to 123, a pseudo random noise code pattern for the spread-spectrum encoding is pre-defined on a transmitter-by-transmitter basis. In order words, the code pattern is different on a transmitter-by-transmitter basis (i.e., on a satellite-by-satellite basis). The encoding circuit is operable to spectrum-spreading the message using the above pseudo random noise code. Each of the transmitters 120 to 123 is operable to convert the encoded signal into a high-frequency signal and emit the converted signal to outer space via the transmission antenna.

In the above manner, each of the transmitters 120 to 123 emits a spread-spectrum signal causing no harmful interference with that of the remaining transmitters. The "causing no harmful interference" can be guaranteed by an output level limited to an extent causing no interference. Alternatively, it may also be achieved by spectral separation techniques. The spread-spectrum signal is transmitted by a carrier wave, for example, called "L1 band". For example, each of the transmitters 120, 121, 122, 123 may be configured to emit a positioning signal having the same frequency by a spread-spectrum communication scheme. Thus, even if respective positioning signals transmitted from the satellites are received by a same one (e.g., 100-1) of the position information providing apparatuses, they can be received without causing interference with each other.

In regard to a positioning signal from the indoor transmitter on the ground, each of the signals from the plurality of indoor transmitters can be received without causing interference with the remaining signals, in the same manner as that in the signals transmitted from the satellites.

[Hardware Configuration of Indoor Transmitter 200-1]

Figure 2:
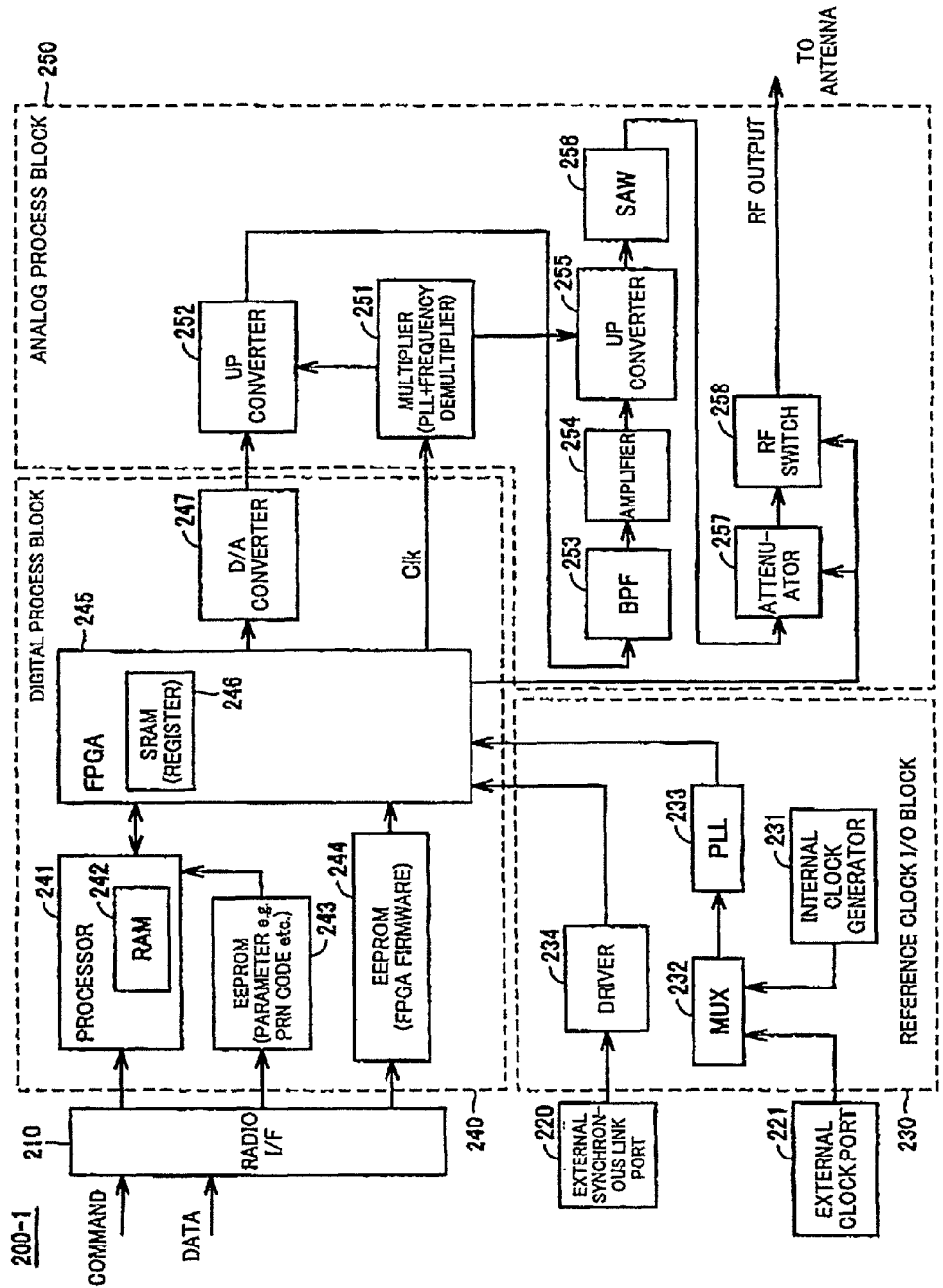
FIG. 2 is a block diagram showing a hardware configuration of an indoor transmitter 200-1.

With reference to FIG. 2, the indoor transmitter 200-1 will be described below. FIG. 2 is a block diagram showing a hardware configuration of the indoor transmitter 200-1.

The indoor transmitter 200-1 comprises a radio (wireless) interface (hereinafter referred to as "radio I/F") 210, a digital processing block 240, a reference clock input/output block (hereinafter referred to as "reference clock I/O block") 230 electrically connected to the digital processing block 210 and for supplying a reference clock for an operation of each circuit section, an analog processing block 250 electrically connected to the digital processing block 210, an antenna (not shown) electrically connected to the analog processing block 250 and for sending out a positioning signal, and a power supply (not shown) for supplying a power supply potential to each section of the indoor transmitter 200-1.

The power supply may be incorporated in the indoor transmitter 200-1, or the indoor transmitter 200-1 may be configured to receive a supply of electric power from the outside.

(Radio Communication Interface)

The radio I/F 210 is a radio (wireless) communication interface, and designed to receive an external command, and receive and, if necessary, transmit data about a setting parameter and a program (firmware, etc.) from/to the outside, by near-field communication, such as Bluetooth (trademark), or radio communications, such as PHS (Personal Handy-phone system) or a mobile phone network.

Based on the radio I/F 210, the indoor transmitter 200-1 is allowed to change a setting parameter, such as position data (data indicative of an installation location of the indoor transmitter 200-1) to be transmitted from the indoor transmitter 200-1, or change firmware so as to cope with a different communication scheme, even after it is installed on a ceiling or the like in an indoor area.

In the first embodiment, it is presupposed that an interface is a wireless type. Alternatively, in cases where a wired interface is advantageous even in consideration of wiring to an installation location, time/labor for installation, etc, the interface may be a wired type.

(Digital Processing Block)

The digital processing block 210 comprises: a processor 241 which is operable, according to a command from the radio I/F 210 or according to a program, to control an operation of the indoor transmitter 200-1; a RAM (Random Access Memory) 242 which stores therein a program to be executed by the processor 241; an EEPROM (Electronically Erasable Programmable Read-Only Memory) 243 for storing therein a setting parameter and others as a part of data from the radio I/F 210; a field programmable gate array (hereinafter referred to as "FPGA") 245 which is operable, under control of the processor 241, to generate a baseband signal to be sent out from the indoor transmitter 200-1; an EEPROM 244 for storing therein firmware of the FPGA 245, as a part of the data from the radio I/F 210; and a digital/analog converter (hereinafter referred to as "D/A converter") 247 which is operable to convert the baseband signal output from the FPGA 245, into an analog signal, and give the analog signal to the analog block 250.

More specifically, the digital processing block 240 is configured to generate data which is a source of a signal to be transmitted as a positioning signal from the indoor transmitter 200-1. Further, the digital processing block 240 is configured to send out the generated data to the analog processing block 250 in the form of a bit stream.

Although not particularly limited to the following, for example, upon application of power to the FPGA 245, the firmware program stored in the EEPROM 244 is loaded on the FPGA 245. Information (bit stream data) of the firmware program is loaded on a configuration memory composed of an SRAM (Static Random Memory) 246 within the FPGA 245. Individual bit data of the loaded bit stream data serves as information source for a circuit to be achieved on the FPGA 245, to allow a resource provided in the FPGA 245 to be customizes in such a manner to achieve a circuit specific to the firmware program. As above, the FPGA 245 has external configuration data without relying on hardware, so that high versatility and flexibility can be achieved.

Further, the processor 241 is operable, according to an external command received from the radio I/F 210 and based on data stored in the EEPROM 243, to store the following data in the SRAM 246 (register), as a parameter to be set for the indoor transmitter 200-1.

1) Spread code (PRN code)
2) Transmitter ID
3) Transmitter coordinate
4) Message (which is formed in the same format as that of the navigation message from the satellite, through the FPGA 245)
5) Digital filter selection parameter As described later, 1 MHz, 2 MHz and 4 MHz band-pass filters (center frequency: 1575.42 MHz) are pre-programmed in the FPGA 245. The "digital filter selection parameter" is a parameter for selecting one of the band-pass filters.

A program for the operation of the processor 241 is also pre-stored in the EEPROM 243. Upon activation of the indoor transmitter 200-1, this program is read out from the EEPROM 243 and transferred to the RAM 242.

A storage device for storing therein a program or data is not limited to the EEPROM 243 or the EEPROM 244. The storage device may be a type capable, at least, of holding data in a nonvolatile manner. Further, in cases where data is input from outside as described later, the storage device may be a type capable of allowing data to be written therein. A data structure of data to be stored in the EEPROM 243 will be described later.

(Analog Processing Block)

The analog processing block 250 is configured to modulate a 1.57542 GHz carrier wave using the bit stream data output from the digital processing block 240, to generate a transmitter signal, and send out the transmitter signal to the antenna. The signal is emitted from the antenna.

More specifically, a signal output from the D/A converter 247 of the digital processing block 240 is up-converted by an up-converter 252. Then, after only a part of the up-converted signal in a give frequency band is amplified through a band-pass filter (BPF) 253 and an amplifier 254, the amplified signal is up-converted by an up-converter 255 again. Then, after a part of the up-converted signal in a given frequency band is extracted by a SAW (Surface Acoustic Wave) filter, the extracted signal is converted into a signal having a predetermined intensity by a variable attenuator 257 and an RF switch 258, and the obtained signal is sent out from the antenna.

A clock for use in the up-converter 252 and the up-converter 255 is generated by multiplying the clock supplied from the reference clock I/O block 230 to the FPGA 245, through a multiplier 251.

Setting of respective levels of the variable attenuator 257 and the RF switch 258 is controlled by a control signal from the processor 241 via the FPGA 245. The RF switch 258 is operable to effectively change a signal intensity by means of so-called "PM (Pulse Modulation)". Each of the variable attenuator 257 and the RF switch 258 operates as a part of an after-mentioned "function of variably adjusting I/Q modulated amplitudes individually".

Figure 8:
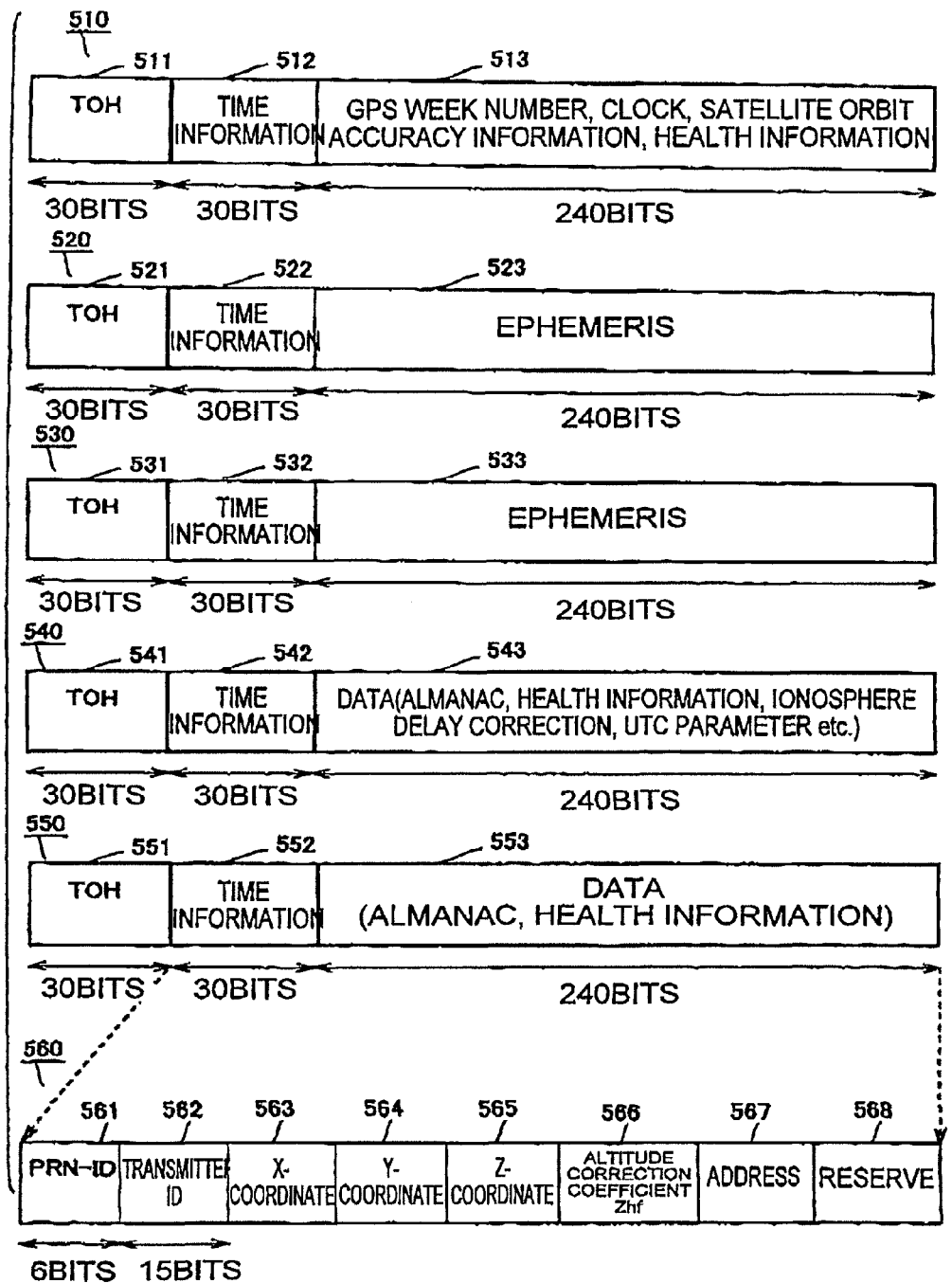
FIG. 8 is a diagram showing a configuration of a signal 500 to be emitted from a transmitter mounted on a OPS satellite.

In the above manner, a signal having a configuration similar to that of a positioning signal from the satellite is emitted from the indoor transmitter 200-1. In this case, a content of the signal is not exactly identical to that included in a positioning signal emitted from the satellite. One example of the signal to be emitted from the indoor transmitter 200-1 will be described later (FIG. 8).

In the above description, the FPGA 245 is used as a processing unit for achieving a digital signal processing in the digital processing block 240. Alternatively, any other suitable type of processing unit may be used, as long as it is capable of changing a modulation function of a radio (wireless) unit by means of software.

In FIG. 2, a clock signal (Clk) is supplied to the analog processing block 250 via the digital processing block 240. Alternatively, the clock signal may be directly supplied from the reference clock I/O block 230 to the analog processing block 250.

In the first embodiment, the digital processing block 240 and the analog processing block 250 are shown separately, for the sake of clarifying the illustration. However, in a physical aspect, they may be mixedly mounted on a single chip.

(Reference Clock I/O Block)

The reference clock I/O block 230 is configured to supply a clock signal for governing the operation of the digital processing block 240 or a clock signal for generating a carrier wave, to the digital processing block 240.

In an "external synchronization mode", a driver 234 of the reference clock I/O block 230 is operable to supply a clock signal to the digital processing block 240 and others, based on a synchronizing signal given from an external clock generator to an external synchronous link port 220.

Further, in an "external clock mode", a multiplexer 232 of the reference clock I/O block 230 is operable to select an external clock signal given to an external clock port 220 in such a manner that a clock signal is output from a PLL (Phase Locked Loop) circuit 233 and supplied to the digital processing block 240 and others, in synchronization with the external clock.

In an "internal clock mode", the multiplexer 232 of the reference clock I/O block 230 is operable to select an internal clock signal generated by an internal clock generator 231 in such a manner that a clock signal is output from the PLL (Phase Locked Loop) circuit 233 and supplied to the digital processing block 240 and others, in synchronization with the internal clock.

An internal state (e.g., a "PLL control" signal) of the indoor transmitter may be monitored from the radio I/F 210, based on a signal output from the processor 241. A digital input/output interface 260 may be configured to accept an input of a code pattern of a pseudo random noise code for spread-modulating a signal to be emitted from the indoor transmitter 200-1, or the radio I/F 210 may be configured to accept an input of additional data to be emitted from the indoor transmitter 200-1. For example, the additional data may include text data (position data) indicative of an installation location of the indoor transmitter 200-1. In cases where the indoor transmitter 200-1 is installed in a commercial area, such as a department store, advertisement data may be input into the indoor transmitter 200-1, as the additional data.

When the spread code (PRN code) pattern is input into the indoor transmitter 200-1, it is written in a predefined area in the EEPROM 243. Subsequently, the written PRN-ID is included in a positioning signal. The additional data is also written into an area reserved in the EEPROM 243 depending on a type of data.

[Data Structure of Data to be Stored in EEPROM 243]

Figure 3:
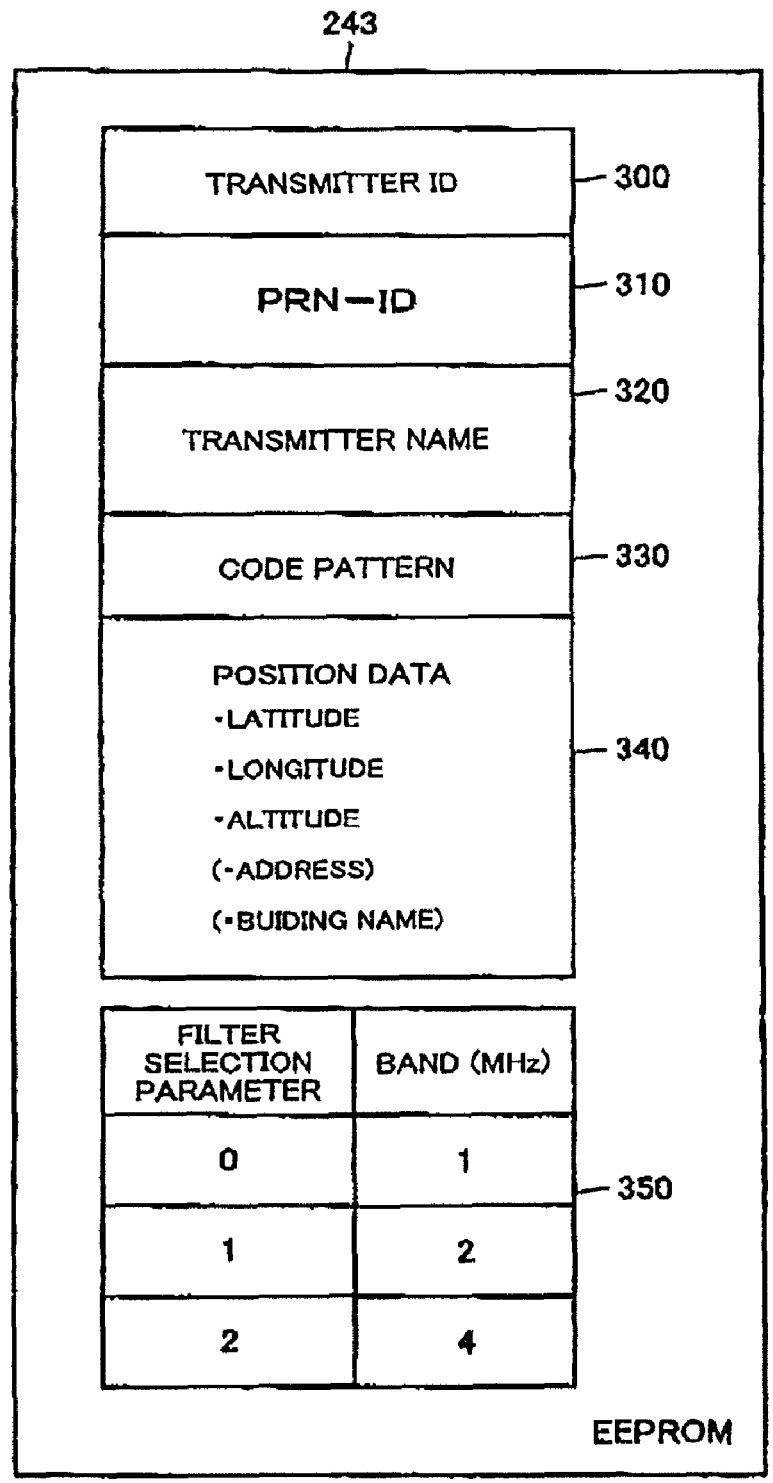
FIG. 3 is a diagram conceptually showing one mode of data storage in an EEPROM 243 provided in the indoor transmitter 200-1.

With reference to FIG. 3, a data structure of data to be stored in the EEPROM 243 will be described below.

FIG. 3 is a diagram conceptually showing one mode of data storage in the EEPROM 243 provided in the indoor transmitter 200-1. The EEPROM 243 includes a plurality of areas 300 to 350 for storing data therein.

In the area 300, a transmitter ID is stored as a number for identifying a transmitter. For example, the transmitter ID may be a numerical character and/or an alphabetical character, or a combination thereof, which is written in a memory in a nonvolatile manner during production of the transmitter.

A PRN-ID of a spread code (PRN code) assigned to the transmitter is stored in the area 310. A transmitter name is stored in the region 320 in the form of text data.

A spread code (PRN code) pattern assigned to the transmitter is stored in the area 330. The spread code pattern assigned to the transmitter is one of a plural finite number of code patterns which are selected from a large number of code patterns belonging in the same category as that of the spread code patterns for the satellites and pre-assigned to a position information providing system according to an embodiment of the present invention. Thus, the spread code pattern assigned to the transmitter is different from that assigned to each of the satellites.

The number of spread code (PRN code) patterns assigned to the position information providing system is finite, whereas the number of indoor transmitters varies depending on a size of an installation site for each of the indoor transmitters, or a structure of the installation site (the number of floors of a building, etc.), so that the number of indoor transmitters is likely to become greater than that of the code patterns. Thus, there is a possibility that a plurality of indoor transmitters have the same pseudo random noise code pattern. In this case, an installation location of each of the indoor transmitters having the same code pattern may be set in consideration of an output of a signal. This makes it possible to prevent a plurality of positioning signals using the same pseudo random noise code pattern from being received by a same one of the position information providing apparatuses, at the same timing.

Position data for identifying an installation location of the indoor transmitter 200-1 is stored in the area 340. For example, the position data is expressed as a combination of longitude, latitude and altitude. In addition to or in place of the position data, a mail address/building name may be stored in the area 340. In this specification, data capable of identifying an installation location of the indoor transmitter 200-1 only by itself, such as a "combination of longitude, latitude and altitude", "mail address/building name", or the "combination of longitude, latitude and altitude, and mail address/building name", will be referred to as "position-ID (identification) data".

Further, a filter selection parameter for filter selection is stored in the area 350. Although not specifically limited to the following, the area 350 may be configured such that a filter selection parameter "0", a filter selection parameter "1" and a filter selection parameter "2" are associated, respectively, with "1 MHz", "2 MHz" and "4 MHz" to be selected as bandwidths of the band-pass filters.

In FIG. 3, each of the PRN-ID, the transmitter name, the pseudo random noise code pattern", the position-ID data and the filter selection parameter may be replaced with additional data input through the radio I/F 210, as mentioned above.

[Configuration of FPGA 245]

A circuit to be achieved by the FPGA 245 illustrated in FIG. 2 will be described below.

Figure 4:
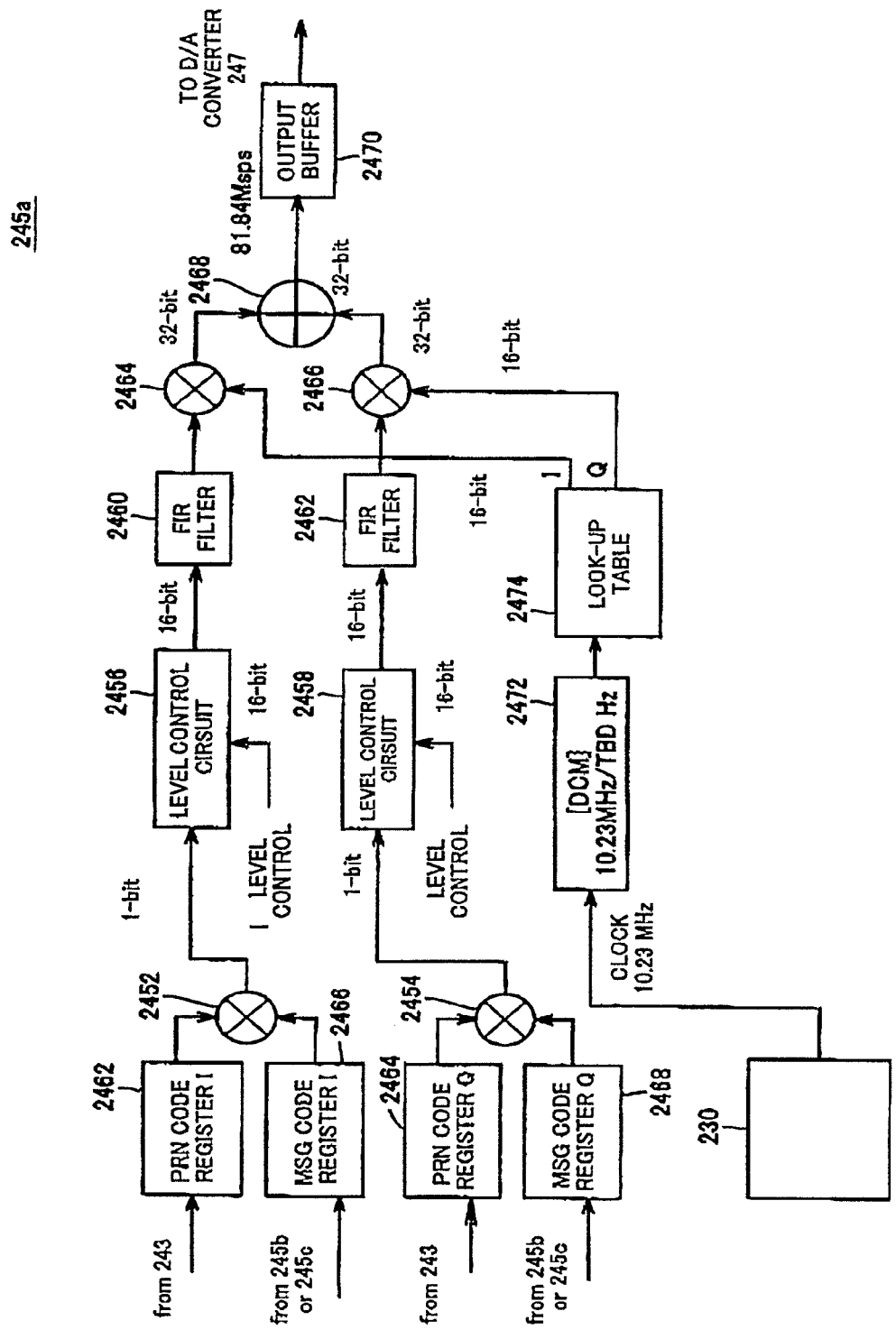
FIG. 4 is a functional block diagram for explaining a configuration of a modulator 245a for performing modulation according to a signal format, in a circuit achieved by an FPGA 245.

FIG. 4 is a functional block diagram for explaining a configuration of a modulator 245a for modulating a baseband signal of a C/A (Coarse/Access) code as a positioning signal superimposed on an L1 band (1575.42 MHz) of a carrier wave of an existing GPA signal, or a baseband signal of an L1C code as a positioning signal used in the L1 band of a new satellite-based position determination system (such as the Japanese quasi-zenith satellite system, in conformity to a signal format thereof, in a circuit achieved by an FPGA 245.

As one example, the following description will be made on an assumption that the C/A code is subjected to BPSK (Binary Phase Shift Keying) modulation, and the L1C code is subjected to QPSK (Quadrature Phase Shift Keying) modulation. As will become clear from the following description, a modulation scheme designed to convert a digital value into an analog value is not limited to the BPSK modulation and the QPSK modulation, but may be any other suitable scheme achievable by the FPGA 245.

The configuration illustrated in FIG. 4 is fundamentally a QPSK modulator-based configuration. However, if the same signal is superimposed on each of an I-phase signal and a Q-phase signal, a resulting modulation becomes equivalent to the BPSK modulation. Based on this concept, the circuit is configured to achieve both the BPSK modulation and the QPSK modulation. Alternatively, it may be programmed to form an independent circuit on a modulation scheme-by-modulation scheme basis, depending on which of the modulation schemes is achieved by the modulator 245_a_.

Referring to FIG. 4, the modulator 245_a_ comprises two PRN code registers 2462, 2464 each adapted to receive a PRN code stored in the EEPROM 243 and store therein the received PRN code, and two message code registers 2466, 2468 each adapted to receive, from an after-mentioned message-data generation unit 245_b_ or message-data generation unit 245_c_, message data conforming to the signal format of the C/A code or L1C code, and store therein the received message data.

More specifically, the PRN code set in the EEPROM 243 is input from outside to each of the PRN code registers 2462, 2464. Further, as described above, the same data is stored in each of the message code registers 2466, 2468 in the BPSK modulation, or two types of different data, i.e., data for the I phase and data for the Q phase, are stored in respective ones of the message code registers 2466, 2468 in the QPSK modulation.

The modulator 245_a_ further comprises: a multiplier 2453 for multiplying time-series data read out from the PRN code register 2462 by time-series data read out from the message code register 2466; a multiplier 2454 for multiplying time-series data read out from the PRN code register 2464 by time-series data read out from the message code register 2468; a level control circuit 2456 for changing an intensity of a signal input from the multiplier 2452 under control of a level control signal LVC1 from the processor 241; a level control circuit 2458 for changing an intensity of a signal input from the multiplier 2454 under control of a level control signal LVC2 from the processor 241; an FIR (Far Infrared Rays) filter 2460 which functions as a band-pass filter of one of the bandwidths selected by the filter selection parameter, with respect to an output from the level control circuit 2456; and an FIR filter 2462 which functions as a band-pass filter of one of the bandwidths selected by the filter selection parameter, with respect to an output from the level control circuit 2458.

The modulator 245_a_ further comprises: a clock circuit 2472 for generating a modulation reference clock conforming to the signal format, based on the clock signal from the reference clock I/O block 230; a look-up table 2474 for outputting respective data corresponding to a preset sine wave and a preset cosine wave, to serve as an I-phase modulation signal and a Q-phase modulation signal, respectively; a multiplier 2464 for multiplying a signal equivalent to a sine wave output from the look-up table 2474 by a signal from the FIR filter 2460; a multiplier 2466 for multiplying a signal equivalent to a cosine wave output from the look-up table 2474 by a signal from the FIR filter 2462; an adder 2468 for adding respective signals from the multipliers 2464, 2466 together; and an output buffer 2470 for buffering an output from the adder 2368 and output the buffered output to the D/A converter 247.

Data included in a signal output from the modulator 245_a_ to the D/A converter 247 is formed as follows.

[Mode for Outputting Signal Compatible with Existing GPS Signal]

In cases where a circuit configuration is formed to output a signal compatible with the existing GPS signal (i.e., a signal compatible with the L1C/A code: L1C/A-compatible signal), by the firmware of the FPGA 245, the modulator 245_a_ is operable to modulate each of the Q-phase signal and the I-phase signal to have the information "longitude/latitude/altitude" of the transmitter as a message, so as to generate a BPSK-modulated signal. As used herein, the term "compatible signal" means a signal which has a common signal format with another signal and therefore allows a receiver to receive them using the same front-end unit.

[Mode for Outputting Signal Compatible with L1C Signal: L1C-Compatible Signal]

The following description will be made about cases where a circuit configuration is formed to output a signal compatible with an L1C signal, according to the firmware of the FPGA 245.

As a background, the L1C signal from the satellite will be briefly described.

The L1C signal from the satellite is QPSK-modulated as mentioned above, wherein a pilot signal for capture by a receiver (capture-assisting pilot signal) is modulated and superimposed on a Q-phase signal. The Q-phase signal has a higher level than an I-phase signal by 3 dB. Further, a navigation message is superimposed on the I-phase signal.

The reason why the capture-assisting pilot signal is superimposed on the Q-phase signal is as follows.

The C/A code of the existing GPS signal is a signal consisting of 1023 chips and having a cycle period of 1 msec, wherein the same signal (one message data) is continued for 20 cycle periods of the C/A codes. Thus, an S/N ratio can be improved by data integration. In contrast, the L1C signal consists of 10230 chips and has a cycle period of 10 msec, wherein the same signal is continued for only one cycle period of the L1C signal. Thus, the data integration cannot be utilized for improvement in S/N ratio. Therefore, it is necessary to use the Q-phase signal on the L1C signal from the satellite, as a capture-assisting signal.

Differently, in an L1C-compatible signal (signal compatible with the L1C signal) from the indoor transmitter 200-1, the transmitter ID can be superimposed on the Q-phase signal. The reason is that an intensity of a signal emitted from the indoor transmitter 200-1 is greater than that of a signal transmitted from the GPS satellite, and therefore there is no need for the capture-assisting signal. This is based on situations where the signal from the OPS satellite requires the capture-assisting signal because it becomes weak through propagation toward the ground, whereas the indoor transmitter is required to increase the signal intensity in order to prevent the occurrence of multipath and unstable propagation. Further, the position-ID data, such as longitude, latitude and altitude, is superimposed on the 1-phase signal.

Figure 5:
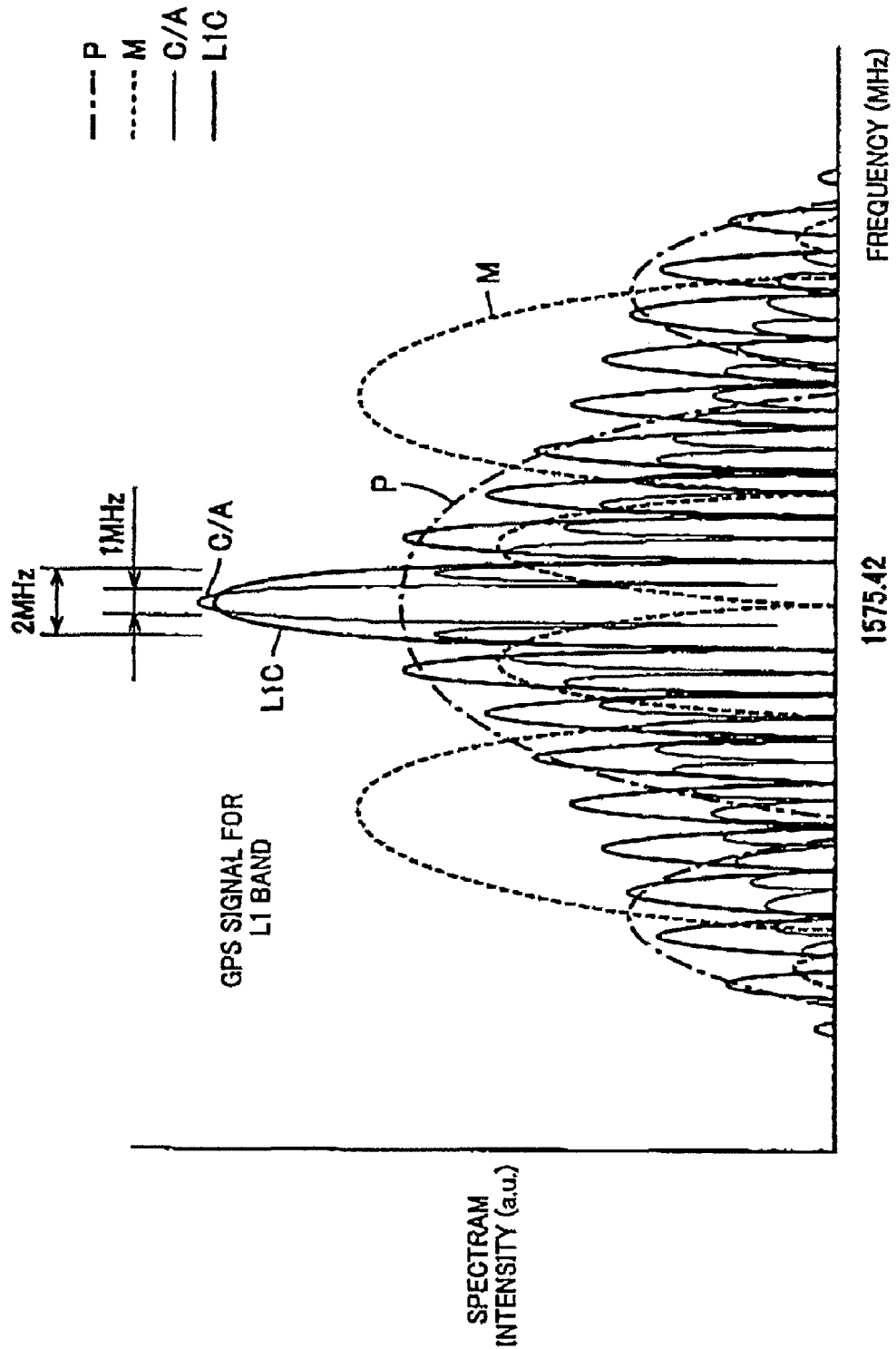
FIG. 5 is a graph showing spectral intensity distributions of an L1C/A code signal and an L1C code signal.

FIG. 5 is a graph showing spectral intensity distributions of an L1C/A code signal and an L1C code signal. In FIG. 5, spectrum intensities of a P code as a military code to be transmitted from a satellite together with the C/A code in the L1 band, and an M code as a military code to be transmitted from a satellite together with the L1C code in the L1 band, are additionally shown.

As shown in FIG. 5, in the C/A code, there are a main peak at a center frequency of 1575.42 MHz, and a sidelobe signal around the center frequency. In the L1C code, there is a null point at the center frequency 1575.42 MHz to suppress interference with the C/A code. Further, there are two main peaks on both sides of the null point, and a sidelobe signal on an outward side of the main peaks.

Thus, in the C/A code, only the main peak can be extracted using a band-pass filter with a bandwidth of 1 MHz. In the L1C code, only the main peaks can be extracted using a band-pass filter with a bandwidth of 2 MHz.

As mentioned above, an intensity of a signal transmitted from the indoor transmitter 200-1 at a site where the signal is received, is greater than that of a signal transmitted from the GPS satellite at a time when the signal is received on the ground. Thus, it becomes possible to transmit only an intended frequency component to suppress interference with other signals.

[Massage-Data Generation Unit 245b]

Figure 6:
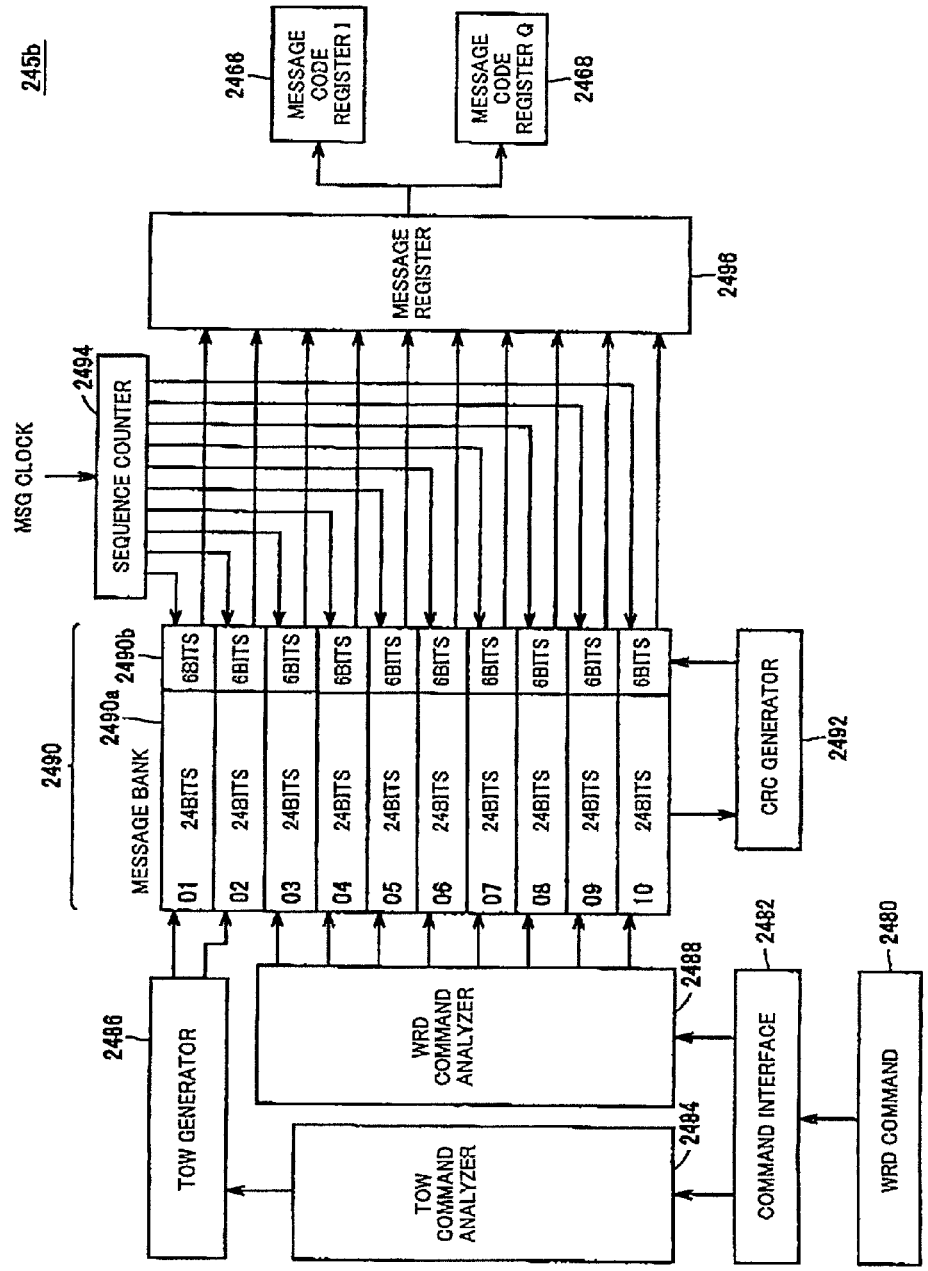
FIG. 6 is a functional block diagram showing a configuration of a message-data generation unit 245b.

FIG. 6 is a functional block diagram showing a configuration of a message-data generation unit 245b, in cases where the firmware of the FPGA 245 is set to transmit a signal compatible with the L1-band C/A code.

As described below, the message-data generation unit 245b is designed to perform a processing of superimposing position-ID data and other data given from outside thereto, on a portion of the L1-band C/A code corresponding to a navigation message, in conformity to a signal format.

The message-data generation unit 245b comprises: a command interface 2482 for accepting a command 2480 from the processor 241; a TOW command analyzer 2484 for reading information about TOW (Time Of Week) in the L1-band C/A code, based on the command given from the command interface 2482; a command analyzer 2488 for reading a content for a command other than the TOW command; a TOW generator 2486 for generating TOW information; and a message bank 2490 for receiving the TOW information from the TOW generator 2486 and message information from the command analyzer 2488 and storing them therein.

The message bank 2490 includes two banks 01, 02 each having a capacity of 30 bits to store therein the TOW information, and eight banks 03 to 10 each having a capacity of 30 bits to store therein other message information. Each of the banks 01 to 10 has an information storage area 2490a with a capacity of 24 bits, and a CEC generator 2492 is provided to generate a CRC code (6 bits) for error detection, based on 24-bit data in the area 2490a; and store the CRC code in an area 2490b of a corresponding one of the banks subsequent to the area 2490a.

A sequence counter 2494 is provided to sequentially give a read signal to the banks 01 to 10 in synchronization with an MSG clock based on the clock from the reference clock I/O block 230. In response to the read signal, data is read out from each of the banks 01 to 10, and stored in a message register 2496.

Data in the message register 2496 is written in each of two message code registers 2466, 2468. The subsequent processing is as described in connection with the operation of the modulator 245a in FIG. 4.

[Message Data Generation Unit 245c]

Figure 7:
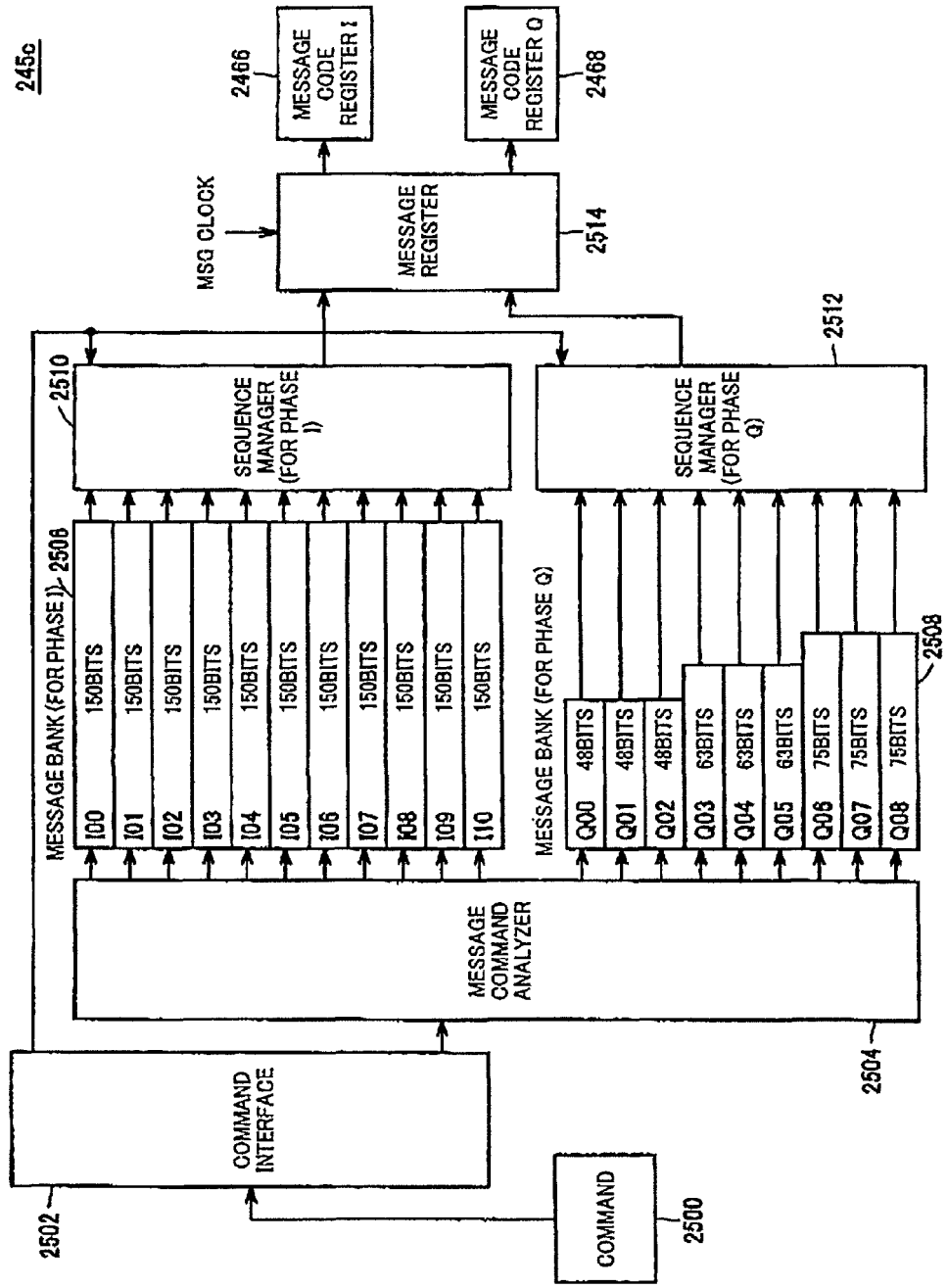
FIG. 7 is a functional block diagram showing a configuration of a message-data generation unit 245c.

FIG. 7 is a functional block diagram showing a configuration of a message-data generation unit 245c, in cases where the firmware of the FPGA 245 is set to transmit a signal compatible with the MC code.

As described below, the message-data generation unit 245c is designed to perform a processing of superimposing position-ID data and other data given from outside thereto, on a portion of the L1C code corresponding to a navigation message and a pilot signal, in conformity to a signal format.

The message-data generation unit 245c comprises: a command interface 2502 for accepting a command 2500 from the processor 241; a message command analyzer 2504 for analyzing a content of data to be transmitted as a message, based on the command given from the command interface 2502; a message bank 2506 for receiving I-phase related message information from the message command analyzer 2504 and storing therein the I-phase related message information; and a message bank 2508 for receiving Q-phase related message information from the message command analyzer 2504 and storing therein the Q-phase related message information.

The message bank 2506 includes eleven banks I00 to I10 each having a capacity of 150 bits to store therein the I-phase related information. The message bank 2508 includes three banks Q00 to Q02 each having a capacity of 48 bits to store therein the Q-phase related information, three banks Q03 to Q05 each having a capacity of 63 bits to store therein the Q-phase related information, and three banks Q06 to Q08 each having a capacity of 75 bits to store therein the Q-phase related information. The capacity of each of the Q-phase related banks is not limited to the above values. For example, each of the capacities of the banks Q01 to Q08 may be set to 150 bits, i.e., the same capacity as that of each of the I-phase related banks.

For example, the transmitter ID is stored in the Q-phase related message bank 2508. Further, in addition to the aforementioned "position-ID data", other data, such as "advertisement data", "traffic information", "weather information" and/or "disaster information" given from an outside of the indoor transmitter 200-1 through the radio I/F 210, may be stored in the I-phase related message bank 2506. For example, the disaster information includes earthquake (prediction/occurrence) information. As used therein, the term "outside" includes a server apparatus operated by a business entity, a public office, etc., providing the above information. The information may be transmitted from the outside server apparatus in real time, or may be periodically updated. Alternatively, the information may be updated by an operations manager of the indoor transmitter 200-1. For example, in cases where the indoor transmitter 200-1 is installed in a department store, advertisement data may be given to the indoor transmitter 200-1 by the operations manager, as one business operation of the department store.

Although not particularly limited to the following, an error-correction BCH code may be added to data to be stored in the banks Q00 to Q08, and an error-detection code may be added to data to be stored in the banks I00 to I10. In this case, as to data to be stored in the banks Q00 to Q08, in which the transmitter ID having a relatively short data length is to be repeatedly included, correct data can be obtained every time a signal is received in the relatively short cycle period, so that received data can be quickly fixed. This makes it possible to fix the received data in the Q-phase related message bank at a timing earlier than the I-phase related message bank, and move into an after-mentioned position-information acquisition processing (query to a server).

The message-data generation unit 245c further comprises: a sequence manager 2510 for reading out from the banks I00 to I10 data to be included in I-phase information, in a sequence according to a command from the command interface 2502; and a sequence manager 2512 for reading out from the banks Q00 to Q08 data to be included in Q-phase information, in a sequence according to a command from the command interface 2502.

The message-data generation unit 245c further comprises a message register 2514 for sequentially reading out I-phase and Q-phase related data from the sequence manager 2510 and the sequence manager 2512, in synchronization with the MSG clock based on the clock from the reference clock I/O block 230, and writing the I-phase and Q-phase related data in the message code registers 2466, 2468, respectively.

Data in the message register 2514 is written in each of the message code registers 2466, 2468. The subsequent processing is as described in connection with the operation of the modulator 245a in FIG. 4.

On the assumption that a signal generated by the message-data generation unit 245c is transmitted from the indoor transmitter 200-1, a receiver (position information providing apparatus) is provided with a plurality of divided storage areas corresponding to respective ones of the I-phased related 150-bit message banks I00 to I10 of the indoor transmitter, and a plurality of divided storage areas corresponding to respective ones of the Q-phased related message banks Q00 to Q08 of the indoor transmitter. Thus, every time the receiver newly receives one of the data stored in the banks I00 to I10 or the banks Q00 to Q08, a content of a corresponding one of the storage areas of the receiver is updated. For this purpose, data to be stored in each of the banks I00 to I10 and Q00 to Q08 includes an identifier for identifying the bank associated therewith.

The signal to be generated by the message-data generation unit 245c and transmitted from the indoor transmitter 200-1 as a message is summarized as follows. In the following description, the signal generated by the message-data generation unit 245c will be referred to as "L1C-compatible message".

The L1C-compatible message comprises an I-phase signal and a Q-phase signal. Each of the I-phase signal and the Q-phase signal is modulated with an independent individual message. More specifically, the Q-phase signal is modulated, for example, with relatively short information, such as the transmitter ID. A data length of the Q-phase signal is less than that of the I-phase signal, so that the receiver can quickly capture the Q-phase signal, and shortly acquire the transmitter ID. However, the transmitter ID itself has a direct meaning (e.g., position information). Thus, the receiver cannot know its position only by the transmitter ID. Therefore, in a certain situation, the receiver may be configured to access a site of a server apparatus which provides position information, via a mobile phone network, and transmit the transmitter ID to the server apparatus, so as to acquire position information associated with the transmitter ID.

The I-phase signal is modulated with the position-ID data. Thus, a certain situation, a message to be included in the I-phase signal may be configured as a variable message. For example, the I-phase signal is modulated with a variable message, such as traffic information, weather information or disaster information, in addition to position information. In this case, when the indoor transmitter 200-1 is connected to an external network, the variable message can be updated in real time to provide desired information to a user of the receiver. The I-phase signal includes position information itself, and therefore the user of the receiver can know his/her position without connecting the receiver to a network. Thus, even in a situation where a disaster occurs and communication networks are congested, as long as the L1C-compatible message is receivable, a position of the receiver can be identified. In such a situation, if the receiver can send out a signal of the position as a mobile phone, a recipient of the signal can more easily identify a position of a sender of the signal (a victim of the disaster).

As above, the I-phase signal and the Q-phase signal have a difference in moderating information itself, and a difference in configuration such as signal length. As a prerequisite to acquiring position information, a receiver is simply required to have a capability to receive at least one of the two signals. In a certain situation, the receiver is configured to receive both the two signals. In another situation, the receiver is configured to allow a user to selectively receive one of the two signals according to need. This selection is achieved by allowing the user to input a setting for defining which of the two signals is to be received, into the receiver. In yet another situation, the receiver is configured to automatically switch an I-phase signal-receiving mode to a Q-phase signal-receiving mode, for example, in response to a failure in connection to the server via a communication network due to congestion of the communication network. In this case, the configuration may be achieved according to an application of the receiver to enhance the convenience of the receiver.

[Data Structure of Signal to be Transmitted from Indoor Transmitter 200-1]

Firstly, a data structure of a signal compatible with an L1-band C/A code with a message generated by the message-data generation unit 245b will be described.

(L1C/A-Compatible Signal)

With reference to FIG. 8, a positioning signal to be transmitted from the transmitter will be described. FIG. 8 is a diagram showing a configuration of a signal 500 to be emitted from the transmitter mounted on the GPS satellite. The signal 500 is comprised of five sub-frames each consisting of 300 bits, i.e., sub-frames 510 to 550. The sub-frames 510 to 550 are repeatedly transmitted by the transmitter. In this example, each of the sub-frames 510 to 550 consists of 300 bits, and is transmitted at a bit rate of 50 bps (bit per second). Thus, each of the sub-frames is transmitted in a period of 6 second.

The 1st sub-frame 510 includes a 30-bit transport overhead 511, a 30-bit clock time information 513, and 240-bit message data 513. More specifically, the clock time information 512 includes clock time information acquired when the 1st sub-frame 510 is generated, and a sub-frame ID. The sub-frame ID is an identification number for distinguishing the 1st sub-frame from the remaining sub-frames. The message data 513 includes a GPS week number, clock information, health information about the GPS satellite, orbit accuracy information about the GPS satellite.

The 2nd sub-frame 520 includes a 30-bit transport overhead 521, a 30-bit clock time information 523, and 240-bit message data 523. The clock time information 522 has the same configuration as that in the 1st sub-frame 510. The message data 523 includes an ephemeris. The ephemeris (broadcast ephemeris) means orbit information about a satellite emitting a positioning signal. The ephemeris is highly-accurate information which is successively updated by an administrative bureau managing navigation of the satellite.

The 3rd sub-frame 530 has the same configuration as that of the 2nd sub-frame 520. Specifically, the 3rd sub-frame 530 includes a 30-bit transport overhead 531, a 30-bit clock time information 533, and 240-bit message data 533. The clock time information 532 has the same configuration as that in the 1st sub-frame 510. The message data 533 includes the ephemeris.

The 4th sub-frame 540 includes a 30-bit transport overhead 541, a 30-bit clock time information 543, and 240-bit message data 543. Differently from the above message data 513, 523, 533, the message data 543 includes almanac information, summary of satellite health information, ionosphere delay information, and an UTC (Coordinated Universal Time) parameter.

The 5th sub-frame 550 includes a 30-bit transport overhead 551, a 30-bit clock time information 553, and 240-bit message data 553. The message data 553 includes almanac information, and summary of satellite health information. Each of the message data 543, 553 is composed of 25 pages, wherein the above different types of information are defined in each page. The almanac information is indicative of respective coarse orbits of all existing GPS satellites including the aforementioned GPS satellites. After the transmission of the sub-frames 510 to 550 is repeated 25 times, the message data is returned to the 1st page, and the same information will be emitted.

The sub-frames 510 to 550 are transmitted from each of the transmitters 120, 121, 122. When the sub-frames 510 to 550 are received by the position information providing apparatus 100, a position of the position information providing apparatus 100 is calculated based on maintenance/management information included in each of the transport overheads 511 to 551, and the message data 513 to 553.

A signal 560 has the same data length as that of each of the message data 513 to 553 included in the sub-frames 510 to 550. The signal 560 is different from each of the sub-frames 510 to 550 in that it has data indicative of a position of an emission source of the signal 560, in place of orbit information expressed as the ephemeris (in the message data 532, 533).

More specifically, the signal 560 comprises a 6-bit PRN-ID 561, a 15-bit transmitter ID 562, an X-coordinate value 563, a Y-coordinate value 564, a Z-coordinate value 565, an altitude correction coefficient (Zhf) 566, an address 567, and a reserve 568. The signal 560 is transmitted from each of the indoor transmitters 200-1, 200-2, 200-3, as substitute for the message data 513 to 553 included in the sub-frames 510 to 550.

The PRN-ID 561 is an identification number of a code pattern of a group of pseudo random noise codes (PRN code pattern) pre-assigned to a transmitter (e.g., each of the indoor transmitters 200-1, 200-2, 200-3) as the emission source of the signal 560. Although the PRN-ID 561 is different from identification numbers of a group of pseudo random noise code patterns assigned to respective ones of the transmitters mounted on the GPS satellites, it is an identification number assigned to a pseudo random noise code pattern belonging in the same category as that of the above group of pseudo random noise code patterns. Thus, in response to reviving the signal 560, the position information providing apparatus can acquire one of the pseudo random noise code patterns assigned to the indoor transmitters, from the received signal 560, and identify whether the signal is the sub-frames 510 to 550 transmitted from the satellite or the signal 560 transmitted from the indoor transmitter.

The X-coordinate value 563, the Y-coordinate value 564 and Z-coordinate value 565 are data indicative of an installation location of the indoor transmitter 200-1. For example, the X-coordinate value 563, the Y-coordinate value 564 and Z-coordinate value 565 may be represented as latitude, longitude and altitude, respectively. The altitude correction coefficient 566 is not essential data item. Thus, if a degree of accuracy greater than that of altitude determine by the Z-coordinate value 565 is not required, the altitude correction coefficient may be omitted. In this case, for example, data indicative of "NULL" is stored in an area to be assigned to the altitude correction coefficient 566.

"Mail address/building name", "advertisement data", "traffic information", "weather information" or "disaster information (e.g., earthquake information)" is assigned to the reserve area 568.

(L1C-Compatible Signal)

Secondly, a data structure of a signal compatible with an L1C code with a message generated by the message-data generation unit 245c will be described.

A data structure of an I-phase signal will be described below.

(1. First Configuration of I-Phase Signal)

Figure 9:
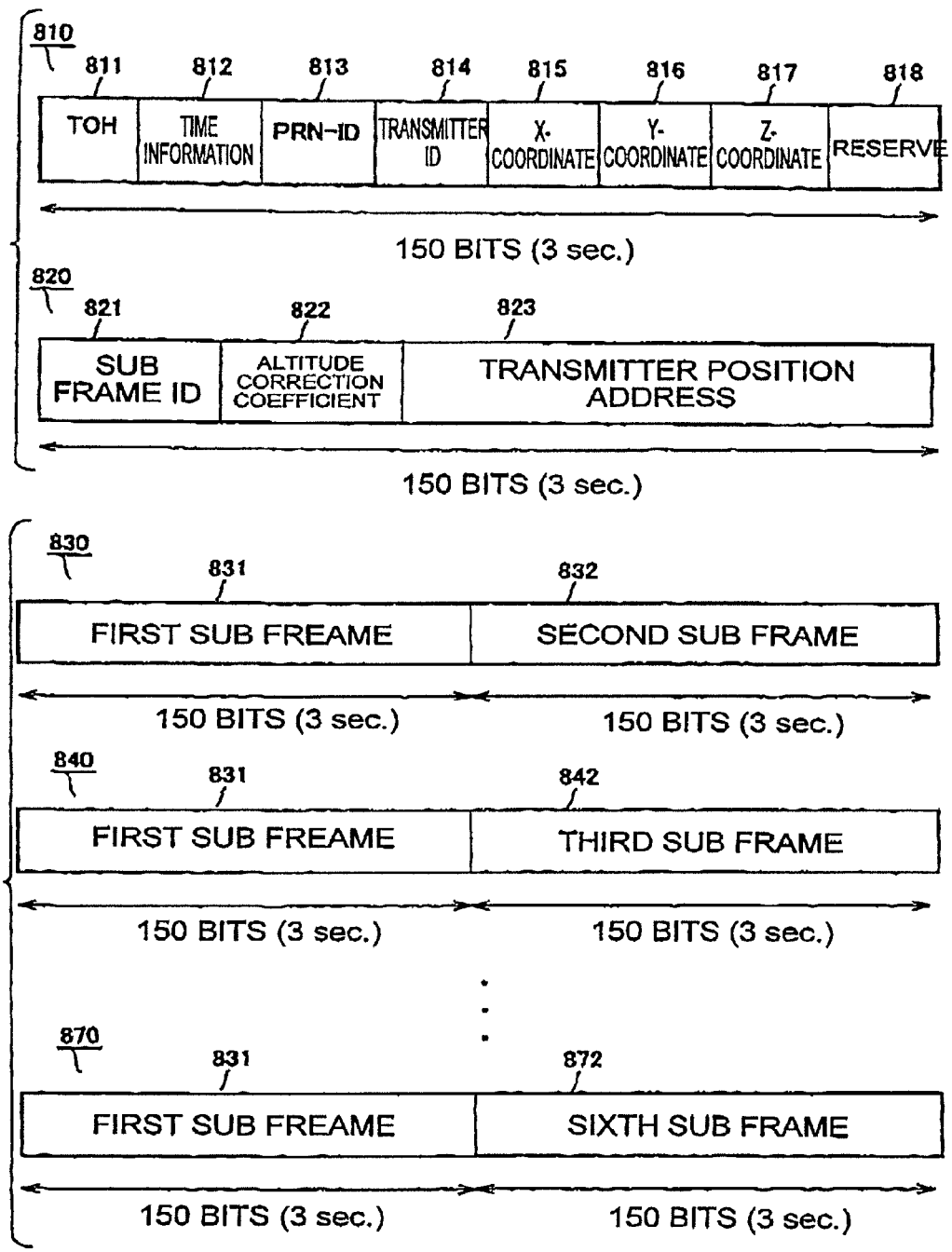
FIG. 9 is a diagram showing a first configuration of an L1C-compatible signal.

FIG. 9 is a diagram showing a first configuration of the L1C-compatible signal. As shown in FIG. 9, six sub-frames are transmitted. A signal 810 is transmitted as an after-mentioned 1st sub-frame by the transmitter. The signal 810 includes a 30-bit transport overhead 811, 30-bit clock time information 812, a 6-bit PRN-ID 813, a 15-bit transmitter ID 814, an X-coordinate value 815, a Y-coordinate value 816 and a Z-coordinate value 817. Initial 60 bits of the signal 810 are the same as initial 60 bits of each of the sub-frames 510 to 550 to be emitted from the GPS satellite.

"Mail address/building name", "advertisement data", "traffic information", "weather information" or "disaster information" is assigned to the reserve area 818.

A signal 820 is transmitted as an after-mentioned 2nd sub-frame by the transmitter. The signal 820 includes a 6-bit sub-frame ID 821, an altitude correction coefficient 822 and a transmitter position address 823. Each of after-mentioned 3rd to 6th sub-frames is also transmitted under a condition that 144 bits on a downstream side of the sub-frame ID of the signal 820 (the altitude correction coefficient 822 and the transmitter position address 823 in the signal 820) are defined as different information. Information to be included in each of the sub-frames is not limited to the above information. For example, advertisement related to position information and/ or Internet URLs (Uniform Resource Locators) may be stored in a predefined area in each of the sub-frames.

Five signals 830 to 870 show an example of a transmission mode of the signals 810, 820 and the 3rd to 6th sub-frames each having the same structure as that of the signal 820. The signal 830 includes a 1st sub-frame 831 and a 2nd sub-frame 832. The 1st sub-frame 831 has the same header as that of each of the sub-frames 510 to 550 to be transmitted from the GPS satellite. The second sub-frame 832 is a frame corresponding to the signal 820.

The signal 840 includes a 1st sub-frame 831 and a 3rd frame 842. The 1st sub-frame 831 is the same as the 1st sub-frame 831 of the signal 830. The 3rd frame 842 has the same structure as that of the signal 820.

The above configuration is repeated to the last signal 870 for transmitting a 6th sub-frame. The signal 870 includes the 1st sub-frame and the 6th sub-frame.

When the transmitter repeatedly transmits from the signal 830 to the signal 870, the 1st sub-frame 831 is transmitted every transmission of the signals. After completion of transmission of the 1st sub-frame, either one of the remaining sub-frames is inserted. Specifically, the sub-frames are transmitted in the following order: 1st sub-frame 831→2nd sub-frame 832→1st sub-frame 831→3rd sub-frame 842→1st sub-frame→ - - - 6th sub-frame 872→1st sub-frame 831→2nd sub-frame 832 - - - .

(2. Second Configuration of I-Phase Signal)

Figure 10:
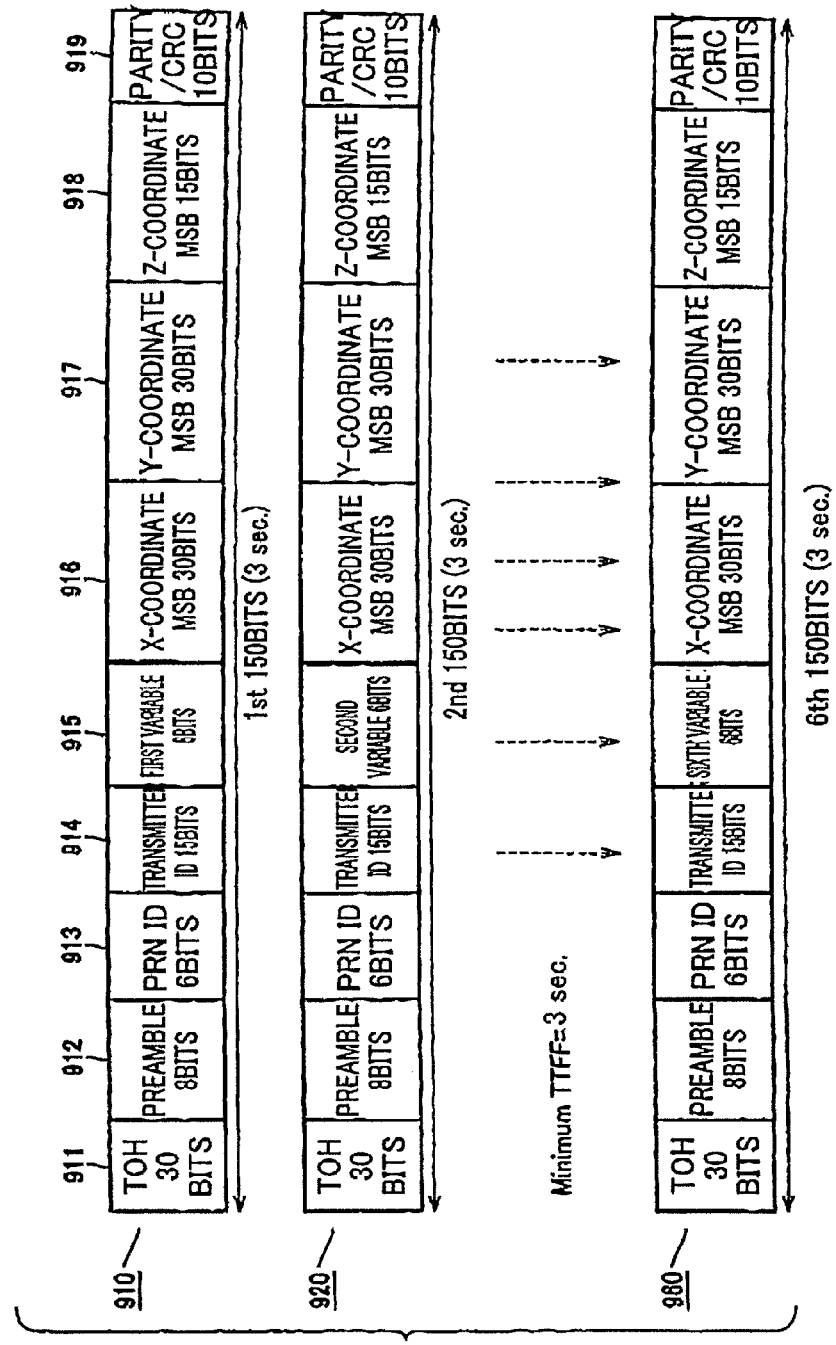
FIG. 10 is a diagram showing a second configuration of the L1C-compatible signal.

FIG. 10 is a diagram showing a second configuration of the L1C-compatible signal. A structure of the message data may be defined independently of the sub-frames 510 to 550.

FIG. 10 conceptually shows the second configuration of the L1C-compatible signal. Referring to FIG. 10, a signal 910 includes a transport overhead 911, a preamble 912, a PRN-ID 913, a transmitter ID 914, a first variable 915, an X-coordinate value 916, a Y-coordinate value 917, a Z-coordinate value 918 and a parity/CRC 919. A signal 920 has a configuration similar to that of the signal 910. The signal 920 includes a second variable 925 in place of the first variable of the signal 910.

Each of the signals has a 150-bit length. The signals each having the same structure are transmitted in a number of six. The signals having the above configuration may be used as a signal to be transmitted from the indoor transmitter.

Each of the signals illustrated in FIG. 10 has the PRN-ID, so that the position information providing apparatus 100 can identify a transmission source of a received signal, based on the PRN-ID. If the transmission source is the indoor transmitter, the X-coordinate value, the Y-coordinate value and the Z-coordinate value are included in the received signal. Thus, the position information providing apparatus 100 can display an indoor position.

[Configuration of Position Information Providing Apparatus 100-1 (Receiver)]

Figure 11:
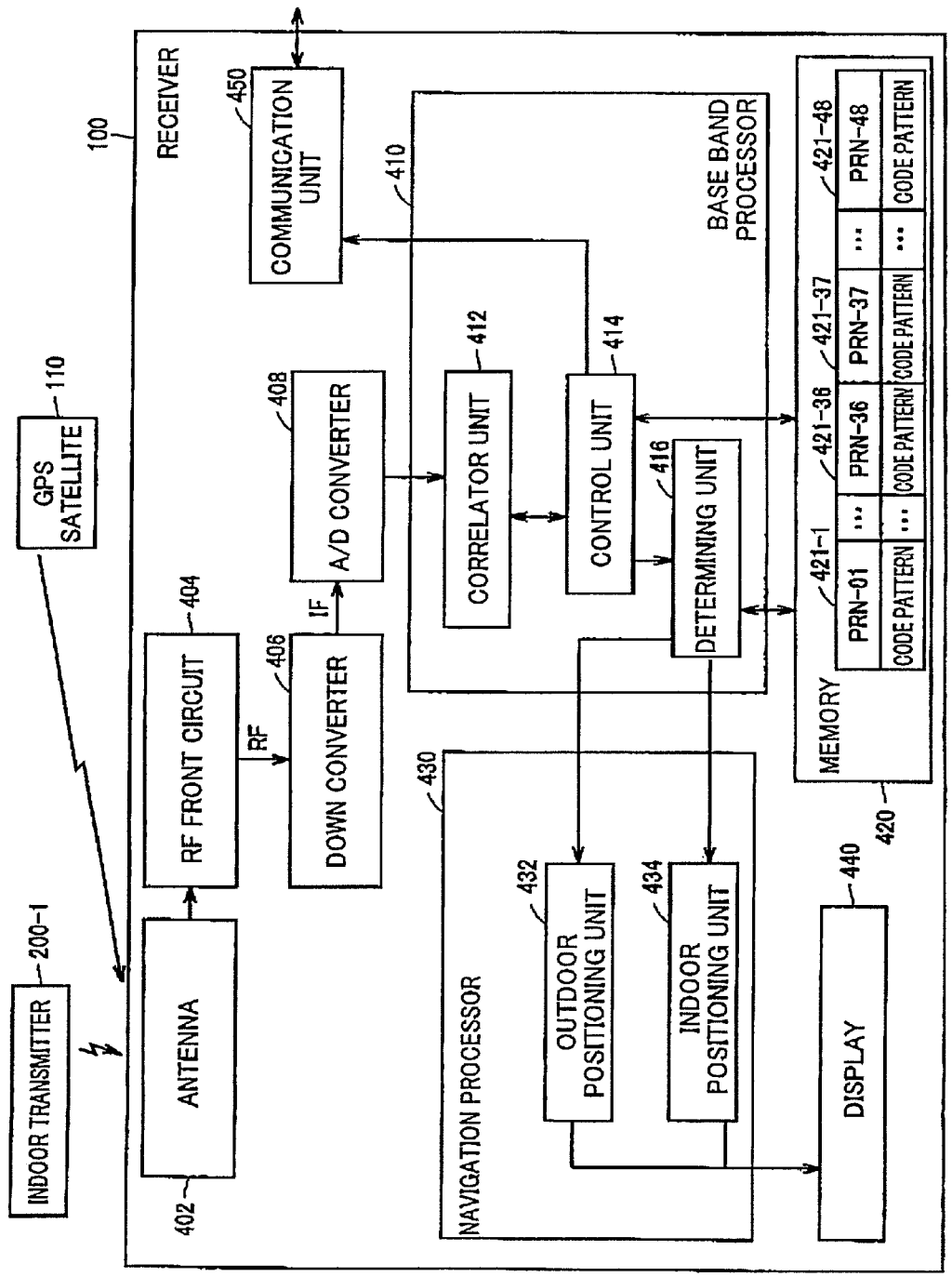
FIG. 11 is a block diagram showing a hardware configuration of a position information providing apparatus 100.

With reference to FIG. 11, the position information providing apparatus 100 will be described. FIG. 11 is a block diagram showing a hardware configuration of the position information providing apparatus 100.

The position information providing apparatus 100 comprises: an antenna 402; an RF (Radio Frequency) front circuit 404 electrically connected to the antenna 402; a down-converter 406 electrically connected to the RF front circuit 404; an A/D (Analog to Digital) converter 408 electrically connected to the down-converter 406; a baseband processor 410 electrically connected to the A/D converter 408; a memory 420 electrically connected to the baseband processor 410; a navigation processor 430 electrically connected to the baseband processor 410; and a display unit 440 electrically connected to the navigation processor 430.

The memory 420 includes a plurality of areas storing therein a plurality of pseudo random noise code patterns as data for identifying each emission source of a positioning signal. For example, in cases where 48 types of code patters are used in the system, the memory 420 may include forty-eight areas 421-1 to 421-48. In another situation, if the number of the types of code patters is further increased, a larger number of areas will be assured in the memory 420. Conversely, the number of the types of code patterns may be set to a value less than the number of areas assured in the memory 420, on a case-by-case basis.

For example, in cases where 48 types of code patterns used in a satellite-base position-determination system using 24 satellites, 24 identification data (PRN codes) for identifying the respective satellites, and 12 extra data are stored in the area 421-1 to 421-36. In this case, for example, a pseudo random noise code pattern for a first one of the satellites may be stored in the area 421-1. The code pattern can be read out from the area 421-1 and subject to a cross-correlation processing with respect to a received signal, so as to perform signal tracking and decoding of a navigation message included in the received signal. Although a technique of reading out pre-stored code patterns has been shown as an example, a technique of generating code patterns using a code-pattern generator may also be employed. For example, the code-pattern generator may be achieved by combining two feedback shift registers. A configuration and an operation of the code-pattern generator would be easily understood by those skilled in the art. Thus, their detailed description will be omitted.

In the same manner, a plurality of pseudo random noise code patterns assigned to the 1st to n-th indoor transmitters each capable of emitting a positioning signal are stored in the areas 421-37 to 421-48. For example, a pseudo random noise code pattern assigned to the 1st indoor transmitter may be stored in the area 421-37. In this case, while the indoor transmitters having 12 types of code patterns can be used in the first embodiment, it is preferable to arrange the indoor transmitters in such a manner that two or more of the indoor transmitters using the same code pattern are not located within a receivable range of a same one of the position information providing apparatuses. This makes it possible to install 12 or more indoor transmitters, for example, in the same floor of the building 130.

Further, in cases where the L1C-compatible signal is received, a plurality of storage areas corresponding to the banks I0 to I10, Q00 to Q08 are set in the memory 420, as described above.

The baseband processor 410 comprises a correlator unit 412 adapted to accept a signal output from the A/D converter 408, a control unit 412 for controlling an operation of the correlator unit 412, and a determining unit 416 for determining an emission source of a positioning signal based on data output from the control unit 414. The navigation processor 430 comprises an outdoor positioning unit (outdoor-position determination unit) 432 for determining an outdoor position of the position information providing apparatus 100, based on a signal output from the determining unit 416, and an indoor positioning unit (indoor-position determination unit) 434 for deriving information indicative of an indoor position of the position information providing apparatus 100, based on data output from the determining unit 416.

The antenna 402 is capable of receiving respective positioning signals emitted from the GPS satellites 110, 111, 112, and a positioning signal emitted from the indoor transmitter 200-1. Further, in cases where the position information providing apparatus 100 is embodied as a mobile phone, the antenna 402 is also capable of transmitting and receiving a signal for wireless telecommunication or data communication, instead of the above positioning signals.

The RF front circuit 404 is operable, in response to accepting a signal received by the antenna 402, to perform a noise removal processing, or a filtering processing for outputting only a signal having a predefined bandwidth. A signal output from the RF front circuit 404 is input into the down-converter 406.

The down-converter 406 is operable to amplify the signal output from the RF front circuit 404, and output the amplified signal as an intermediate-frequency signal. The intermediate-frequency signal is input into the A/D converter 408. The A/D converter 408 is operable to subject the intermediate-frequency signal input thereinto to a digital conversion processing to convert it into digital data. The digital data is input into the baseband processor 410.

In the baseband processor 410, the correlator unit 412 is operable to perform a correlation processing between the received signal and the code pattern read out from the memory 420 by the control unit 414. For example, the control unit 414 is operable to provide two types of code patterns different in code phase by 1 bit, and the correlator unit 412 is operable to perform a processing of matching the two types of code patterns with the digital data send out from the A/D converter 408. Further, the correlator unit 412 is operable, based on the code patterns, to track a positioning signal received by the position information providing apparatus 100 and identify one of the code patterns which has a bit sequence identical to that of the positioning signal. In this manner, the pseudo random noise code pattern is identified. Thus, the position information providing apparatus 100 can determine from which of the satellites the received positioning signal is transmitted, or whether the satellites the received positioning signal is transmitted from the indoor transmitter. Then, the position information providing apparatus 100 is operable, based on the identified code pattern, to demodulate the positioning signal and decode a message therein.

More specifically, the determining unit 416 is operable to perform the above determination and send out data depending on the determination, to the navigation processor 430. The determining unit 416 is operable to determine whether a PRN-ID included in a received positioning signal is identical to a PRN-ID assigned to a transmitter other than the transmitters mounted on the GPS satellites.

One example where 24 GPS satellites are used in a position determination system will be described below. In this case, 36 types of pseudo random noise codes including extra codes are used, wherein PRN-01 to PRN-24 are used as numbers for identifying the respective GPS satellites (PRN-IDs), and PRN-25 to PRN-36 are used as numbers for identifying respective extra satellites. The extra satellite means a satellite which is further launched in addition to an initially launched satellite. The extra satellite is launched to prepare for possible failure of the GPS satellite or the transmitter and others mounted to the GPS satellite.

Further, for example, 12 types of pseudo random noise code patterns are assigned to transmitters (e.g., the indoor transmitters 200-1, - - - ) other than the transmitter mounted on the GPS satellites, wherein numbers different from the PRN-IDs assigned to the satellites, such as PRN-37 to PRN-48, are assigned to respective ones of the transmitters. In other words, in this example, there are 48 PRN-IDs. For example, the PRN-37 to PRN-48 are assigned to the indoor transmitters, while taking account of an arrangement of the indoor transmitters. Thus, if a transmitter output is set to a level capable of avoiding interference between signals emitted from the indoor transmitters, the same PRN-ID may be used in two or more of the indoor transmitters. Based on such arrangement, the transmitters can be used in a number greater than that of the PRN-IDs assigned to transmitters for use on the ground.

The determining unit 416 is operable, with reference to the pseudo random noise code patterns stored in the memory 420, to determine whether a code pattern acquired from a received positioning signal is identical to the code pattern assigned to each of the indoor transmitters. If the two code patters are identical to each other, the determining unit 416 determines that the received positioning signal is transmitted from one of the indoor transmitters. If not, the determining unit 416 determines that the received positioning signal is transmitted from one of the GPS satellites. Then, the determining unit 416 is operable, with reference to the code patterns stored in the memory 420, to determine one of the satellites which is assigned with the acquired code pattern. Although an example based on the code patterns has been shown as methodology for the determination, the determination may be made based on comparison of other data. For example, comparison of the PRN-IDs may be used for the determination.

If a received signal is identified as a signal transmitted from one of the GPS satellites, the determining unit 416 is operable to send out data acquired from the identified signal, to the outdoor positioning unit 432. The data acquired from the identified signal includes a navigation message. Otherwise, if the received signal is identified as a signal transmitted from one of the indoor transmitters, for example, the indoor transmitter 200-1, the determining unit 416 is operable to send out data acquired from the identified signal, to the indoor positioning unit 434. This data is coordinate values pre-set as data for identifying a position of the indoor transmitter 200-1. In a certain situation, an identification number of this transmitter may be used.

In the navigation processor 430, the outdoor positioning unit 432 is operable, based on the data sent out from the determining unit 416, to perform a processing for calculating a position of the position information providing apparatus 100. More specifically, the outdoor positioning unit 432 is operable, based on data included in signals emitted from three or more (preferably, four or more) GPS satellites, to calculate respective propagation times of the signals, and, based on the calculation result, to calculate a position of the position information providing apparatus 100. This processing is performed using a conventional satellite positioning technique. This processing would be easily understood by those skilled in the art. Thus, its description will be omitted.

In the navigation processor 430, the indoor positioning unit 434 is operable, based on the data sent out from the determining unit 416, to perform a processing for position determination in cases where the position information providing apparatus 100 is located in an indoor area. As described later, the indoor transmitter 200-1 is operable to emit a positioning signal including data for identifying a position (position-ID data). Thus, the position information providing apparatus 100 can receive the positioning signal and extract data included in the signal to identify a position of the position information providing apparatus 100 based on the extracted data. The indoor positioning unit 434 performs this processing. Data calculated by the outdoor positioning unit 432 or data read out by the indoor positioning unit 434 is used for display on the display unit 440. More specifically, these data are incorporated in data for displaying a screen image to generate an image for indicating a measured position or an image for indicating a read position (e.g., an installation location of the indoor transmitter 200-1), and the image is displayed by the display unit 440.

The position information providing apparatus 100 further comprises a communication unit 450 for performing data communication with the outside, for example, a position information providing server (not shown), under control of the control unit 414.

In the configuration illustrated in FIG. 11, although not particularly limited to the following, in a signal processing between the reception of a position signal and the generation of display information, the antenna 402, the RF front circuit 404, the down-converter 406 and the A/D converter 408 are formed by hardware, and a processing in each of the baseband processor 410 and the navigation processor 430 may be performed according to a program stored in the memory 420. However, in regard to a processing in the correlator unit 412, the correlator unit 412 may be configured to achieve the processing based on hardware, instead of software.

Figure 12:
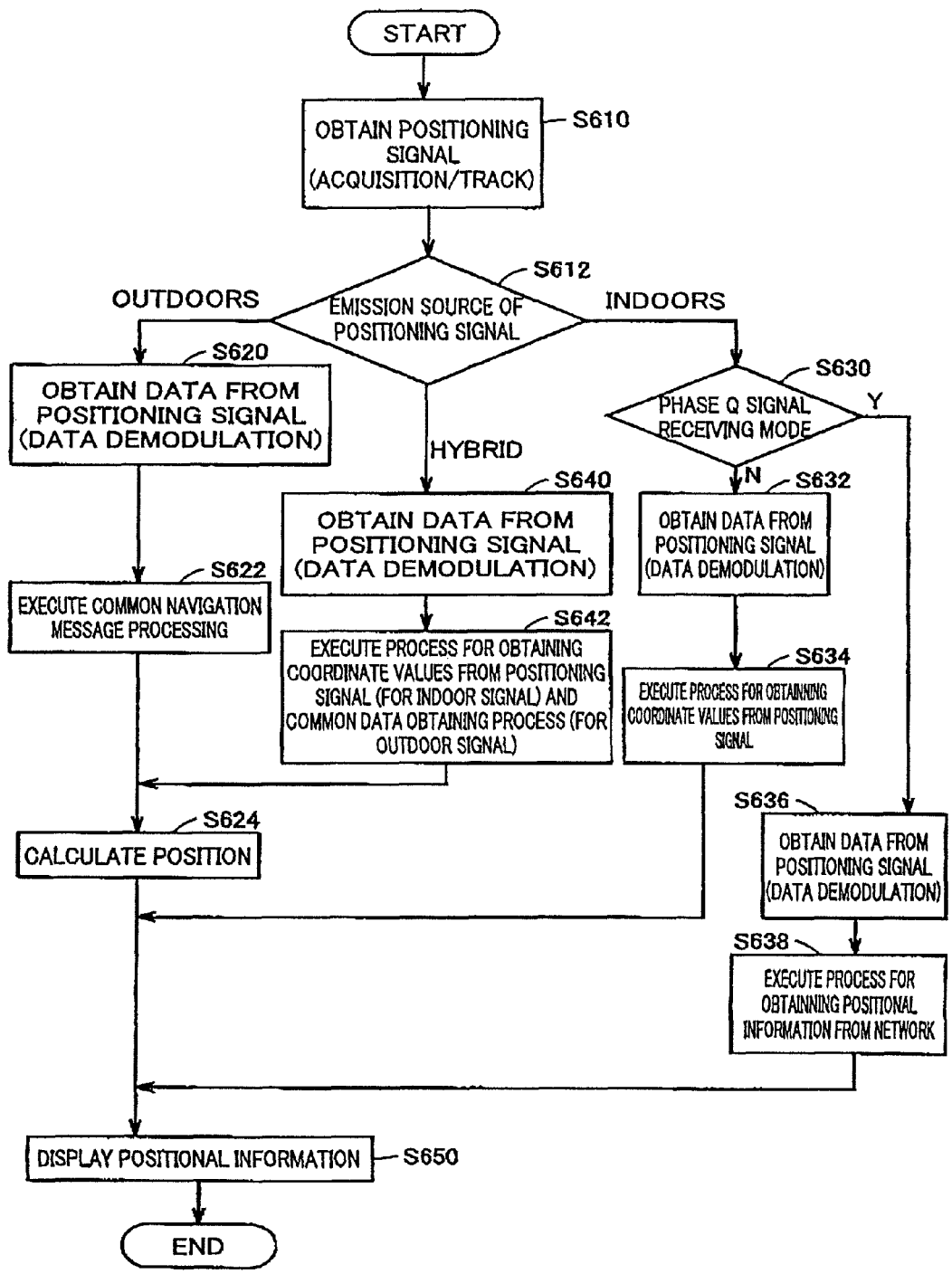
FIG. 12 is a flowchart showing steps of a processing to be performed by the position information providing apparatus 100.

With reference to FIG. 12, a control operation of the position information providing apparatus 100 will be described. FIG. 12 is a flowchart showing steps of a processing to be performed by the baseband processor 410 and the navigation processor 430.

In Step S610, the position information providing apparatus 100 acquires (tracks and captures) a positioning signal. More specifically, the baseband processor 410 accepts an input of a received positioning signal (digital-converted data) from the A/D converter. Then, the baseband processor 410 generates, as replicas of pseudo random noise codes, a plurality of code patterns having different code phases reflecting a possible delay, and detects the presence of absence of correlation between the received positioning signal and each of the code patterns. For example, the number of code patterns to be generated is two times a bit count of the bit patterns. As one example, in cases where a chip rate is 1023 bits, 2046 code patterns having a sequential delay or code-phase difference of ½ bits can be generated. Then, a processing of correlating each of the code patterns with the received signal is performed. In the correlation processing, if an output having an intensity equal to or greater than a predefined value is detected in one of the code patterns, the baseband processor 410 can lock the code pattern, and identify one of the satellites which emits the received positioning signal, based on the locked code pattern. There is only one pseudo random noise code having a bit sequence of the locked code pattern. Thus, a pseudo random noise code used for forming the received positioning signal as a spread spectrum encoded signal is identified.

As descried later, the processing of correlating a received and acquired signal with each of a plurality of replica code patterns generated inside the position information providing apparatus 100 may also be achieved as a parallel processing.

In Step S612, the baseband processor 410 identifies an emission source of the received positioning signal. Specifically, the determining unit 416 identifies an emission source of the received positioning signal, based on the PRN-ID associated with one of the transmitters which is assigned with a pseudo random noise code pattern used during modulation for generating the received positioning signal (e.g., using the memory 420 in FIG. 11). If it is determined that the received positioning signal is emitted from an outdoor area, the control routine is shifted to Step S620. If it is determined that the received positioning signal is emitted in an indoor area, the control routine is shifted to Step S630. Otherwise, if it is determined that the received positioning signal includes a plurality of positioning signals emitted from both the outdoor area and the indoor area, the control routine is shifted to Step S640.

In Step S620, the position information providing apparatus 100 demodulates the positioning signal to acquire data included therein. Specifically, the outdoor positioning unit 432 of the navigation processor 430 demodulates the positioning signal using the code pattern temporarily stored in the memory 420 (the code pattern locked in the aforementioned manner; hereinafter referred to as "locked code pattern") to acquire a navigation message from a sub-frame constituting the positioning signal. Then, in Step S622, the outdoor positioning unit 432 subjects 4 or more acquired positioning signals to a navigation message processing as a preprocessing of position determination, in a conventional manner.

Then, in Step S624, based on a result of the above processing, the outdoor positioning unit 432 performs a processing for calculating a position of the position information providing apparatus 100. For example, in cases where the position information providing apparatus 100 receives positioning signals emitted from 4 or more satellites, a distance calculation is performed using satellite orbit information, clock time information and others included in navigation messages demodulated from respective positioning signals of the satellites.

Otherwise, in cases where, in Step S612, the position information providing apparatus 100 receives a positioning signal emitted from the satellite (outdoor signal) and a positioning signal from the indoor transmitter (indoor signal), the position information providing apparatus 100 demodulates the positioning signals to acquire data included therein, in Step S640. Specifically, the outdoor positioning unit 432 demodulates the positioning signals sent out from the baseband processor 410 using the locked code pattern to acquire data in a sub-frame constituting each of the positioning signals. In this case, the position information providing apparatus 100 operates in a so-called "hybrid mode", because it receives both the positioning signal from the satellite and the positioning signal from the indoor transmitter. Thus, a navigation message having clock time data is acquired from the positioning signal from the satellite, and data having position information such as the coordinate values is acquired from the positioning signal from the indoor transmitter. More specifically, in Step S642, the indoor positioning unit 434 performs a processing of acquiring the X-coordinate value 563, the Y-coordinate value 564 and the Z-coordinate value 565 from the positioning signal emitted from the indoor transmitter 200-1. Further, the indoor positioning unit 434 acquires a navigation message from the positioning signal emitted from the GPS satellite and perform a navigation message processing. Then, the control routine is shifted to Step S624. In this case, an operation of selecting one of the positioning signals to be used in the position determination is performed based, for example, on respective intensities of the indoor signal and the outdoor signal. For example, if the intensity of the indoor signal is greater than that of the outdoor signal, the indoor signal is selected, and the coordinate values included in the indoor signal is used as a position of the position information providing apparatus 100.

Otherwise, in cases where, in Step S612, the emission source of the received positioning signal is an indoor source, and an intensity of the indoor signal is equal to or greater than a given level, the determining unit 414 determines whether the position information providing apparatus 100 is set in the Q-phase signal-receiving mode, in Step S630. If the position information providing apparatus 100 is not set in the Q-phase signal-receiving mode (e.g., it is set in the C/A-receiving mode or the I-phase signal-receiving mode), the position information providing apparatus 100 demodulates the positioning signal to acquire data included therein, in Step S632. Specifically, the indoor positioning unit 434 demodulates the positioning signal sent out from the baseband processor 410 using the locked code pattern to acquire a message data in a sub-frame constituting the positioning signal. This message data is data included in a positioning signal emitted from the indoor transmitter, as substitute for the navigation messages included in the positioning signals emitted from the satellites. Therefore, it is preferable that the message data shares a common format with the navigation message.

Then, in Step S634, the indoor positioning unit 434 acquires coordinate values from the message data (i.e., acquires data for identifying an installation location of the indoor transmitter (e.g., the X-coordinate value 563, the Y-coordinate value 564 and the Z-coordinate value 565 in the signal 560)). In cases where text information indicative of the installation location or a mail address of the installation location is included in the frame in place of the coordinate values, the text information is acquired. Subsequently, the routine is shifted to Step S650.

Otherwise, in Step S630, if the position information providing apparatus 100 is set in the Q-phase signal-receiving mode, the position information providing apparatus 100 demodulates the positioning signal to acquire data (transmitter ID) included therein, in Step S632. Then, in Step S638, the position information providing apparatus 100 transmits the acquired transmitter ID to a server (not shown) via a network, and receives position information corresponding to the acquired transmitter ID from the server.

In Step S650, based on a result of the position determination, the navigation processor 430 performs a processing for displaying the position information on the display unit 440. Specifically, the navigation processor 430 generates image data for indicating the acquired coordinate or data for indicating the installation location of the indoor transmitter 200-1, and sends out the data to the display unit 440. Based on the data, the display unit 440 displays the position information of the position information providing apparatus 100 on a display area.

Figure 13:
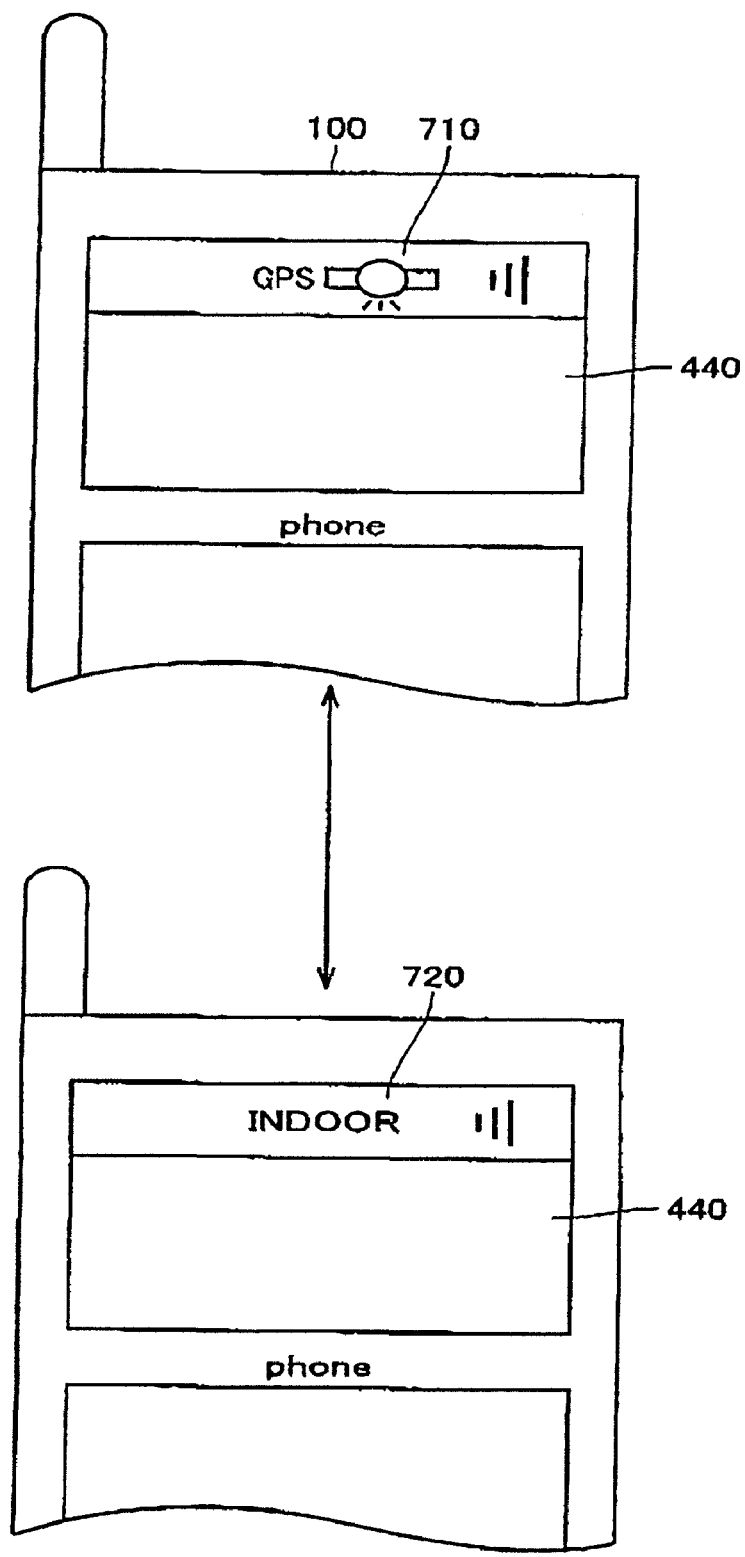
FIG. 13 is a diagram showing a screen image on a display unit 440 of the position information providing apparatus 100.

With reference to FIG. 13, a display mode of the position information of the position information providing apparatus 100 will be described. FIG. 13 is a diagram showing a screen display on the display unit 440 of the position information providing apparatus 100. When the position information providing apparatus 100 receives positioning signals emitted from the GPS satellites in an outdoor area, the display unit 440 displays an icon 710 indicating that position information is acquired based on the GPS positioning signals. Then, when a user of the position information providing apparatus 100 moves to an indoor area, the position information providing apparatus 100 becomes unable to receive positioning signals emitted from the GPS satellites. Instead, the position information providing apparatus 100 receives a signal emitted, for example, from the indoor transmitter 200-1. This signal is being transmitted in the same mode as that of positioning signals to be emitted from the GPS satellites, as mentioned above. Thus, the position information providing apparatus 100 performs a processing for the signal in a manner similar to a processing to be performed when positioning signals from the GPS satellites are received. After the position information providing apparatus 100 acquires position information from the signal, the display unit 440 will display an icon 720 indicating that the position information is acquired based on a signal emitted from a transmitter installed in an indoor area.

As described above, in a location where it is impossible to receive radio waves, such as an inside area of a building or an underground shopping area, the position information providing apparatus 100 in the first embodiment is operable to receive radio waves emitted from a transmitter installed therein (e.g., one of the indoor transmitters 200-1, 200-2, 200-3). Then, the position information providing apparatus 100 is operable to acquire information identifying a position of the transmitter (e.g., coordinate values or mail address) and display the information on the display unit 440. Based on the displayed information, a user of the position information providing apparatus 100 can know a current position. Thus, it becomes possible to provide position information even in a location where it is impossible to directly receive satellite positioning signals.

This makes it possible to ensure stable signal receiving in an indoor area, and provide position information with stable accuracy of about several meters even in an indoor area.

In addition, a clock time on the ground (clock time of a transmitter such as the indoor transmitter 200-1) and a clock time of a satellite may be independent of each other, i.e., are not required to be synchronized with each other. Thus, it becomes possible to suppress an increase in production cost of an indoor transmitter. Further, there is no need to synchronize clock times of a plurality of indoor transmitters, which facilitates system management.

Information for directly identifying an installation location of each of a plurality of indoor transmitters is included in a signal to be transmitted from each of the indoor transmitters, which eliminate a need for calculating position information from signals emitted from a plurality of satellites. Thus, it becomes possible to derive positioning signal based on a signal emitted from one of the indoor transmitter.

Further, a signal-receiving position can be identified by receiving a signal emitted from one of the indoor transmitters, which makes it possible to more easily achieve a position information providing system as compared with the conventional satellite-based position determination systems, such as the GPS.

In the position information providing apparatus 100, hardware achieving the conventional position determination systems can be used to receive a signal transmitted from the indoor transmitter 200-1, without a need for dedicated hardware, and a signal processing can be achieved by changing or modifying software. Thus, there is no need to start design of hardware from zero to use techniques related to the first embodiment. This makes it possible to suppress an increase in cost of the position information providing apparatus 100, which facilitates popularization of the position information providing apparatus 100. Further, it becomes possible to provide a position information providing apparatus capable of preventing an increase in circuit size and complexity in circuit configuration.

More specifically, the memory 420 of the position information providing apparatus 100 holds the predefined PRN-IDs for the indoor transmitters and/or the satellites. The position information providing apparatus 100 is operable, according to a program, to perform a processing for determining whether received radio waves are emitted from the satellites or the indoor transmitter, based on the PRN-ID. This program is achieved by a processing unit, such as the baseband processor. Alternatively, the position information providing apparatus 100 may be configured by changing a circuit element for the determination to a circuit element including a function to be achieved by the program.

In cases where the position information providing apparatus 100 is embodied as a mobile phone, the acquired information may be held in a nonvolatile memory 420, such as a flash memory. Then, when a call sent out from the mobile phone, the data held in the memory 420 may be transmitted to a recipient. In this case, position information about the caller, i.e., position information acquired from the indoor transmitter by the position information providing apparatus 100 is transmitted to a base station relaying the call. The base station stores the position information together with receiving date/time as a call log. Further, if a caller is a emergency contact number (e.g., 110 in Japan), position information of the caller may be directly notified. Thus, the notification of a caller from a mobile can be achieved in the same manner as that in conventional notification of a caller from a fixed-phone during emergency contact.

In regard to a transmitter to be installed in a specific location, the position information providing system is achieved by use of a transmitter capable of emitting a signal similar to a signal to be emitted from a transmitter mounted on a satellite for position determination. Thus, it becomes possible to eliminate a need for newly starting design of a transmitter from zero.

In the position information providing system 10 according to the first embodiment, a spread spectrum signal is used as a positioning signal. In transmission of the spread spectrum signal, an electric power per frequency can be reduced. Thus, as compared with a conventional RF tag, management of radio wave would become easier. This makes it possible to facilitate establishment of a position information providing system.

In the indoor transmitter 200-1, a setting parameter can be changed after installation thereof. Thus, for example, position-ID data for identifying an installation location can be collectively rewritten after the installation is makes it possible to simplify an installation process. Further, among information to be transmitted as messages, "advertisement data", "traffic information", "weather information" and/or "disaster information (e.g., earthquake information)" can be provided to a receiver while being rewritten in real time. Thus, various services can be achieved. Additionally, in the indoor transmitter 200-1, firmware of the FPGA 245 for performing a signal processing can be directly rewritten. Thus, the same hardware can be used in communication schemes (modulation schemes) in various position determination systems.

In the indoor transmitter 200-1, a band of a signal to be transmitted can be selectively limited by a digital band-limiting filter. Thus, it becomes possible to suppress interference with other systems to enhance a frequency utilization rate.

In the indoor transmitter 200-1, different information can be provided between the I-phase signal and the Q-phase signal, so that position information can be flexibly provided depending on situations. In Addition, amplitudes of the I-phase signal and the Q-phase signal can be adjusted individually, so that various phase modulation schemes other than quadrature modulation can be used. Further, a transmission level can be variably adjusted. Thus, depending on an installation location, a transmission power can be set to a value equal to or less than a law or regulations for regulating the use of radio waves, such as the Radio Law in Japan, so that specific authorization to the installation becomes unnecessary.

Example of Modification

Figure 14:
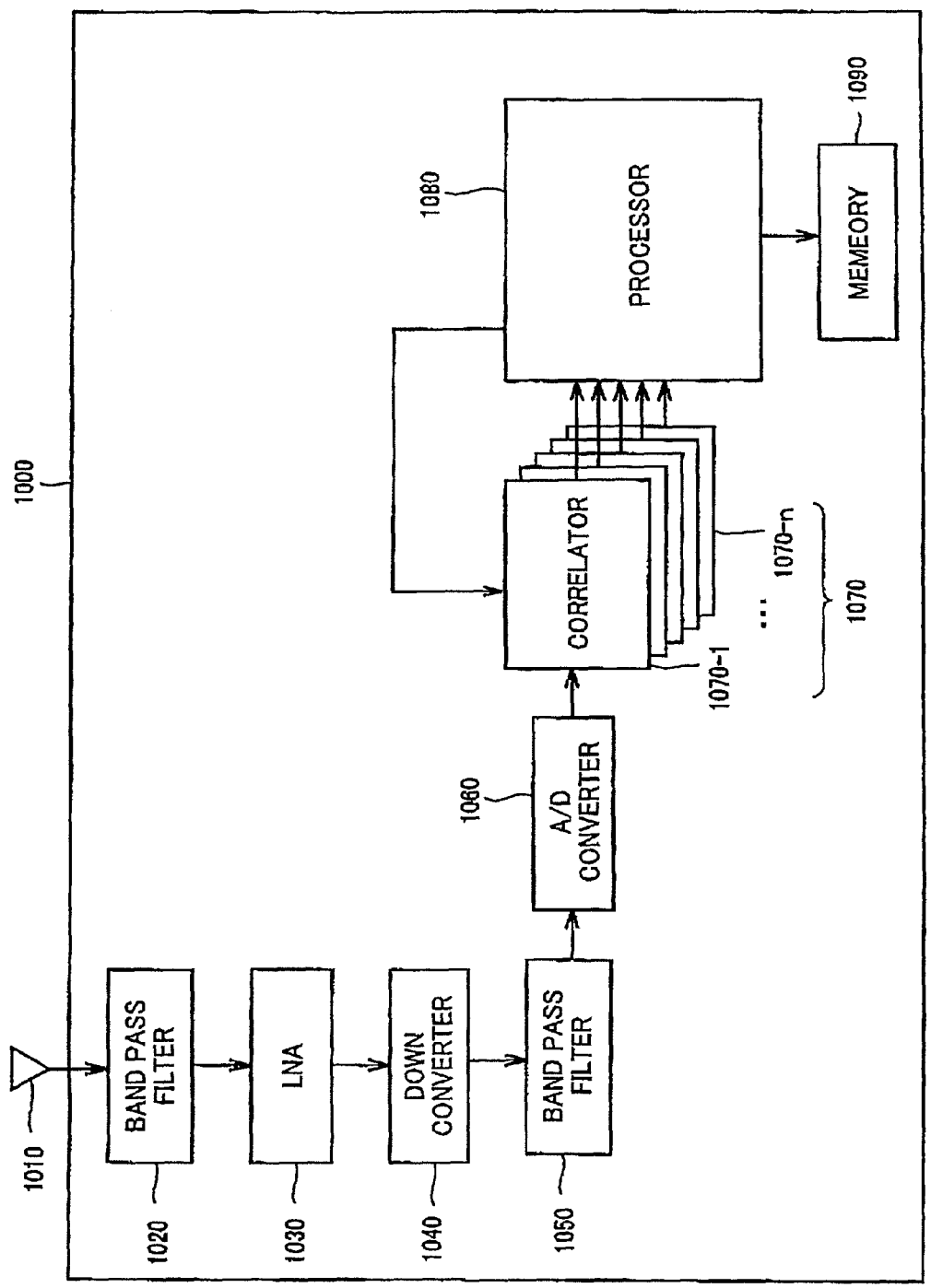
FIG. 14 is a block diagram showing a configuration of a position information providing apparatus 1000 in one example of modification of the first embodiment.

With reference to FIG. 14, one example of modification of the first embodiment will be described. FIG. 14 is a block diagram showing a configuration of a position information providing apparatus 1000 in the example of modification. In the example of modification, a plurality of correlators may be used, in place of the configuration of the correlator unit 412 provided in the position information providing apparatus 100. In this case, a processing for matching replicas with positioning signals is performed in a simultaneous parallel manner, so that a calculation time for position information can be reduced.

The position information providing apparatus 1000 in the example of modification comprises: an antenna 1010; a band-pass filter 1020 electrically connected to the antenna 1010; a low-noise amplifier 1030 electrically connected to the band-pass filter 1020; a down-converter 1040 electrically connected to the low-noise amplifier 1030; a band-pass filter 1050 electrically connected to the down-converter 1040; an A/D converter 1060 electrically connected to the band-pass filter 1050; a parallel correlator 1070 composed of a plurality of correlators and electrically connected to the A/D converter 1060; a processor 1080 electrically connected to the parallel correlator 1070; and a memory 1090 electrically connected to the processor 1080.

The parallel correlator 1070 includes n correlators 1070-1 to 1070-*n*. The correlators are operable, based on a control signal output from the processor 1080, to perform a processing of matching each of a plurality of received positioning signals with respective ones of a plurality of code patterns generated to demodulate the positioning signal, in a simultaneous parallel manner Specifically, the processor 1080 is operable to give an instruction for generating a plurality of code patterns reflecting a possible delay occurring in a pseudo random noise code (having sequentially delayed code phases) to the correlators of the parallel correlator 1070. For example, in the existing GPS, this instruction corresponds to the member of satellites× 2×1023 (length of a pseudo random noise code pattern, to be used). According to the instruction given to each of the correlators of the parallel correlator 1070, the parallel correlator 1070 generates a plurality of code patterns different in code phase using pseudo random noise code patterns set in the satellites. Consequently, in the entire generated code patterns, there is one code patter identical to a pseudo random noise code pattern used for modulation of a received positioning signal. Therefore, the pseudo random noise code pattern can be instantaneously identified by use of the parallel correlator 1070 made up of a plurality of correlators required for performing a matching processing using the code patterns. This operation can also be applied to an operation to be performed when the position information providing apparatus 100 receives a signal from the indoor transmitter. In this case, even if a user of the position information providing apparatus 100 is in an indoor area, position information thereof can be instantaneously acquired.

In other words, the parallel correlator 1070 can perform the matching processing for all of the pseudo random noise code patterns set in the satellites and the pseudo random noise code patterns set in the indoor transmitters, in a simultaneous parallel manner, at its best. Further, even in cases where the matching processing is not performed for all of the pseudo random noise code patterns set in the satellites and the indoor transmitters in consideration of a relationship between the number of correlators and the numbers of pseudo random noise code patterns assigned to the satellites and the indoor transmitters, a time required for requiring position information can be significantly reduced based on the simultaneous parallel processing using the plurality of correlators.

In this example, the satellites and the indoor transmitters are transmitting signals in a spread spectrum scheme, i.e., the same communication scheme, so that pseudo random noise code patterns belonging in the same category can be used as those to be assigned to the satellites and the indoor transmitters. Thus, the parallel correlator can be used for both a signal from each of the satellites and a signal from one of the indoor transmitters to perform a receiving processing in a simultaneous parallel manner without particular distinction between the signals.

Although not particularly limited to the following, in the position information providing apparatus 1000, the antenna 1010, the band-pass filter 1020, the low-noise amplifier (LNA) 1030, the down-converter 1040, the band-pass filter 1050, the A/D converter 1060, and the parallel correlator 1070 for a signal processing between the reception of a position signal and the generation of information to be displayed on a display unit (which is not illustrated in FIG. 14) may be formed by hardware, and a processing for position determination (the control process illustrated in FIG. 12) may be performed by the processor 1080 according to a program stored in the memory 1090.

Second Embodiment

A second embodiment of the present invention will be described below. A position information providing system according to the second embodiment is different from the first embodiment in that a plurality of transmitters are mounted in relatively adjacent relation to each other.

Figure 15:
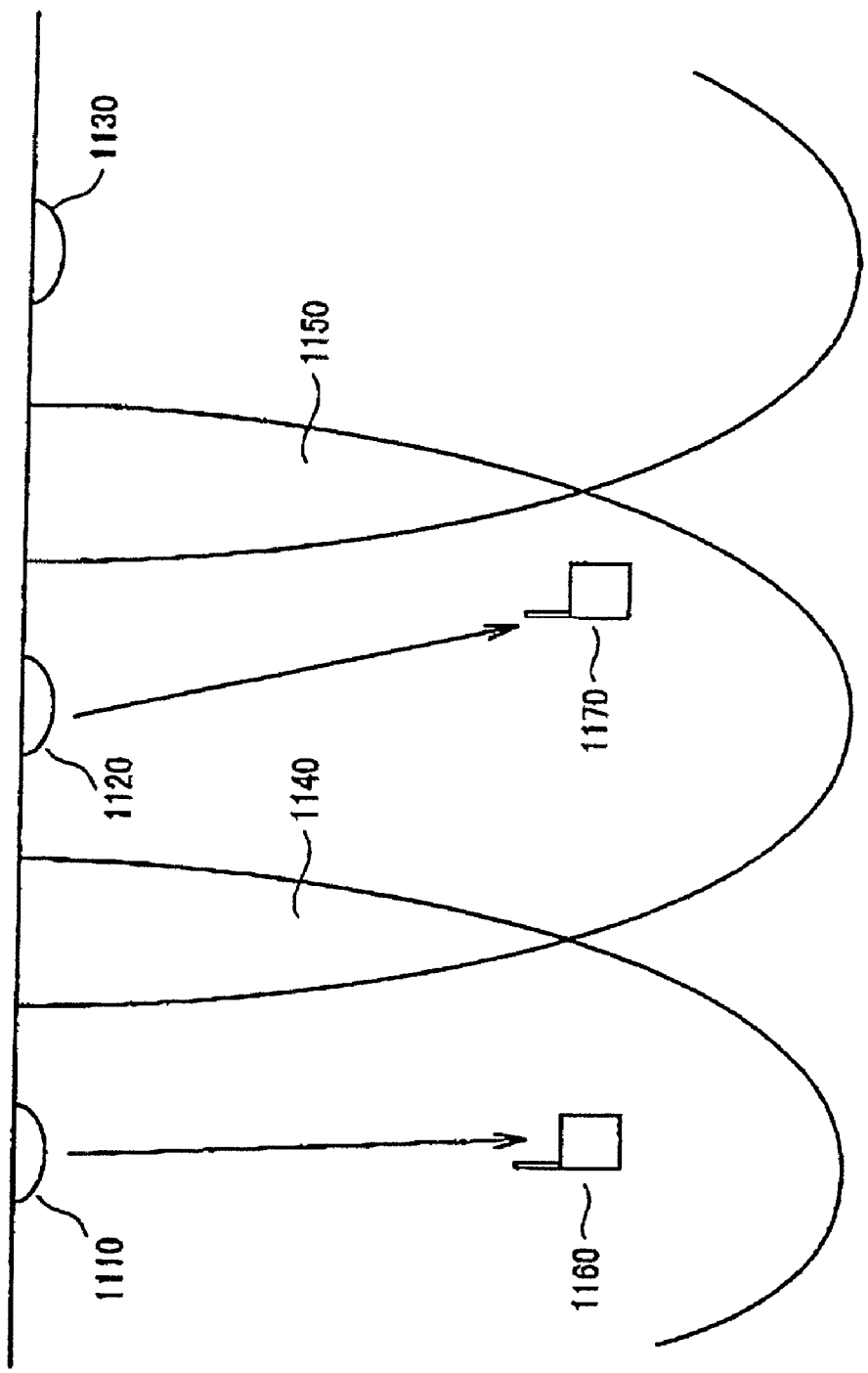
FIG. 15 is a diagram showing a usage state of a position information providing apparatus in a position information providing system according to a second embodiment of the present invention.

FIG. 15 is a diagram showing a usage state of a position information providing apparatus in the second embodiment. Referring to FIG. 15, three indoor transmitters 1110, 1120, 1130 are mounted to a ceiling of the same floor of a building. Each of the indoor transmitters is adapted to perform the same processing as that in the aforementioned indoor transmitter 200-1. Specifically, each of the indoor transmitters is operable to emit a positioning signal including data indicative of an installation location thereof.

In this case, depending on mounting positions of the indoor transmitters, there is a region (i.e., space) where it is possible to receive two positioning signals emitted from adjacent ones of the indoor transmitters. For example, in a region 1140, respective signals emitted from the indoor transmitters 1110, 1120 can be received. Similarly, in a region 1150, respective signals emitted from the indoor transmitters 1120, 1130 can be received.

Therefore, for example, when the position information providing apparatus 1160 in the second embodiment is located at a position illustrated in FIG. 15, the position information providing apparatus 1160 can receive the signal emitted from the indoor transmitter 1110 to acquire data included in the signal to indicate a mounting position of the indoor transmitter 1110, as a position information of the position information providing apparatus 1160. Then, if a user of the position information providing apparatus 1160 moves to a position corresponding to the region 1140, the position information providing apparatus 1160 can receive the signal emitted from the indoor transmitter 1120 in addition to the signal from the indoor transmitter 1110. In this case, when it is determined which of two position-ID data included in the signals should be selected as a position of the position information providing apparatus 1160, the determination may be made based on an intensity of the received signal. Specifically, if the signals emitted from two or more of the indoor transmitters are received, data having a largest one of respective intensity values of the received signals may be used for display of position information. If the received signals have the same intensity, a position of an arithmetic sum of data included in the received signals may be derived to determine a position of the position information providing apparatus 1160.

As above, in the position information providing apparatus 1160 in the second embodiment, even if a plurality of positioning signals are received in an indoor area, an emission source of one of the received signals can be identified, so that a mounting position of the emission source, i.e., a transmitter installed in the indoor area, can be determined.

As used in this specification, the term "indoor" or "indoor area" is not limited to an inside area of a building or other architectural structure, but includes any location where it is difficult or impossible to receive radio waves emitted from a GPS satellite. For example, such a location includes an underground shopping area and an inside area of a railway vehicle.

In the second embodiment, a size of a region to be covered by one of the indoor transmitters can be limited. This makes it possible to eliminate a need for increasing an intensity of the signal to be transmitted from each of the indoor transmitters, and facilitate setting a transmission power to a value equal to or less than a law or regulations for regulating the use of radio waves, such as the Radio Law in Japan, so that specific authorization to the installation becomes unnecessary.

Third Embodiment

A third embodiment of the present invention will be described below. A position information providing apparatus in a position information providing system according to the third embodiment is designed to transmit data for identifying an indoor transmitter (hereinafter referred to as "transmitter ID") to an apparatus for providing information related to the indoor transmitter, instead of determining a position based on data included in the indoor transmitter, wherein a process of acquiring position information is performed based on communications using a mobile phone. Thus, the position information providing apparatus according to the first or second embodiment may be achieved by use of the mobile phone in the third embodiment. In the third embodiment, a position of the mobile phone can be determined based on the transmitter ID. Generally, while a position of a mobile phone is determined as an area of a base station which has received a signal emitted from the mobile phone, the system according to the third embodiment can determine the position of the mobile phone itself. For example, even in a local region where there is a few number of base stations, it becomes possible to accurately determine a position of a mobile phone using the transmitter ID.

In the third embodiment, a configuration or process for performing position determination based on positioning signals from satellites is the same as that in the first and second embodiments. Thus, an operation to be performed when a transmission ID from an indoor transmitter will be primarily described below.

Figure 16:
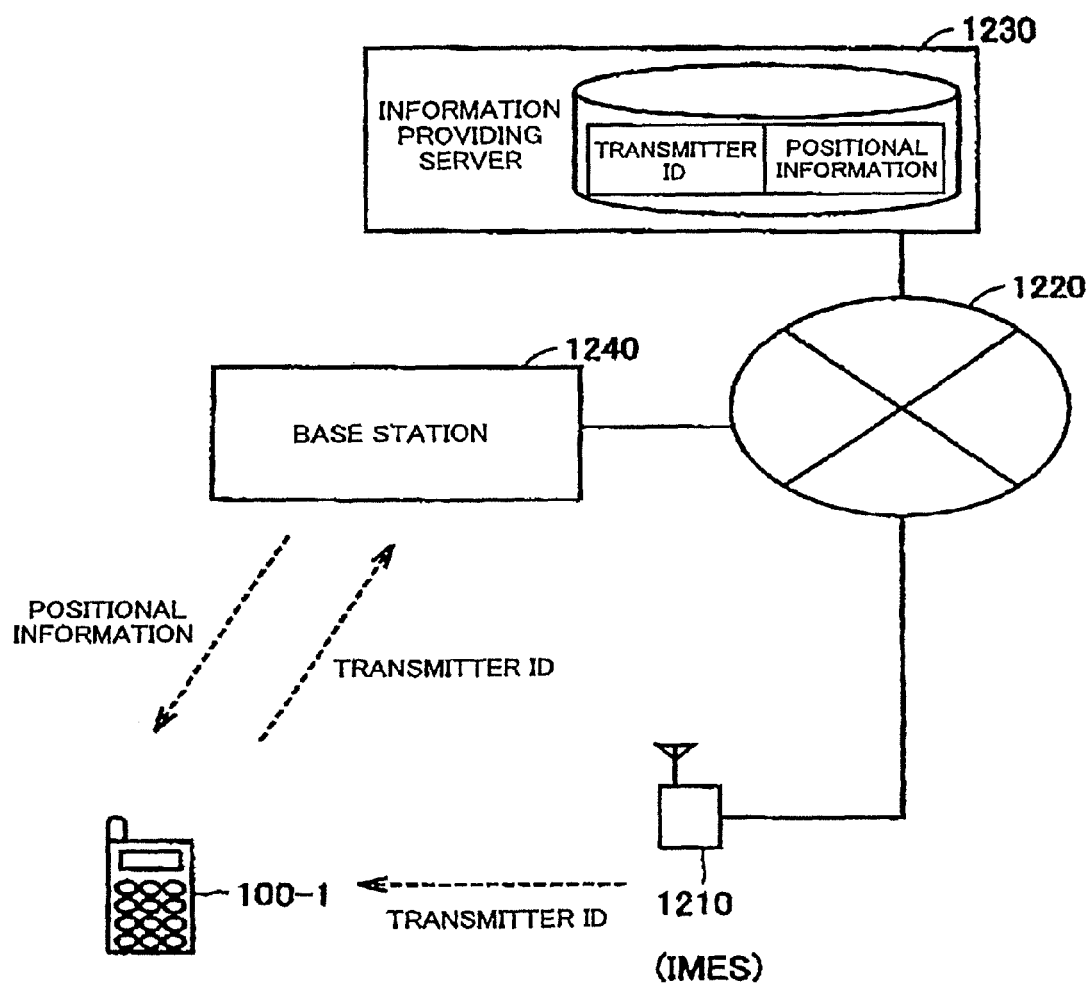
FIG. 16 is a diagram showing a usage state of a position information providing apparatus in a position information providing system according to a third embodiment of the present invention.

FIG. 16 is a diagram showing a usage state of the position information providing apparatus in the third embodiment. The position information providing apparatus is embodied as a mobile phone 1200. The mobile phone 1200 is adapted to be capable of receiving a positioning signal emitted from an indoor transmitter 1210. The indoor transmitter 1210 is connected to the Internet 1220. Further, an information providing server 1230 capable of providing information about the indoor transmitter 1210 is connected to the Internet 1220. The following description will be made on an assumption that a plurality of transmitter IDs and position information associated with respective ones of the transmitter IDs are registered on the information providing server 1230.

Upon receiving a signal emitted from the indoor transmitter 1210, the mobile phone 1200 is acquires a transmitter ID for identifying the indoor transmitter 1210. For example, the transmitter ID is associated with the aforementioned PRN-ID. The mobile phone 1200 transmits the transmitter ID (or together with the PRN-ID) to the information providing server 1230. More specifically, the mobile phone 1200 starts communication with a base station 1240, and sends out packet data including the acquired transmitter ID to the information providing server 1230.

After recognizing the received transmitter ID, the information providing server 1230 refers to database associated with the transmitter ID and reads out position-ID data associated with the transmitter ID. The information providing server 1230 transmits the position-ID data to the base station 1240, and then the base station 1240 transmits the position-ID data. After detecting incoming of the position-ID data, the mobile phone 1200 can acquire a position of the indoor transmitter 1210 based on the position-ID data, according a viewing operation by a user of the mobile phone 1200.

Figure 17:
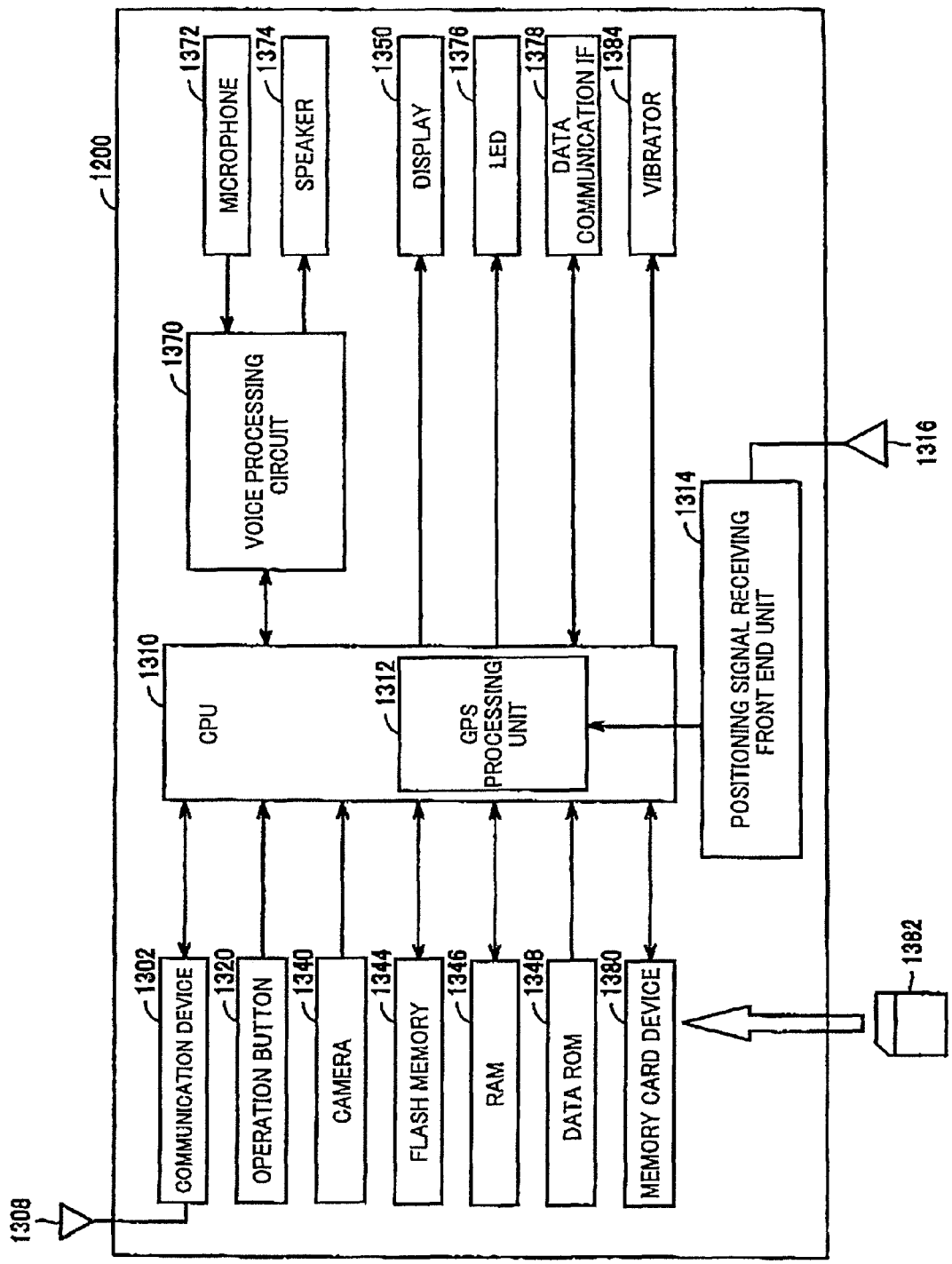
FIG. 17 is a block diagram showing a hardware configuration of a mobile phone 1200 in the third embodiment.

With reference to FIG. 17, a configuration of the mobile phone 1200 will be described. FIG. 17 is a block diagram showing a hardware configuration of the portable phone 1200. The mobile phone comprises: an antenna 1308, a communication device 1302, a CPU 1310, an operation button 1320, a camera 1340, a flash memory 1344, a RAM 1346, a data ROM 1348, a memory card drive 1380, a voice-signal processing circuit 1370, a microphone 1372, a speaker 1374, a display unit 1350, an LED (Light-Emitting device), a data communication IF 1378 and a vibrator 1384, which are electrically connected to each other.

A signal received by the antenna 1308 is transferred to the CPU 1310 by the communication device 1302. The CPU 1310 is operable to transfer the signal to the voice-signal processing circuit 1370. Then, the voice-signal processing circuit 1370 is operable to subject the signal to a predefined signal processing, and then sends the processed signal to the speaker 1374. The speaker 1374 is operable, based on the processed signal, to output voice.

The microphone 1372 is operable to accept voice generated toward the mobile phone 1200, and output a signal corresponding to the generated voice to the voice-signal processing circuit 1370. The voice-signal processing circuit 1370 is operable, based on the signal, to perform a predefined signal processing for call, and send out a processed signal to the CPU 1310. Then, the CPU 1310 is operable to convert the processed data into transmission data, and send out the transmission data to the communication device 1302. The communication device 1302 is operable to transmit the signal through the antenna 1308, and then the base station 1240 is operable to receive the signal.

The flash memory 1344 stores therein data sent from the CPU 1310. Reversely, the CPU 1310 is operable to read out data stored in the flash memory 1344, and perform a predefined processing using the data.

The RAM 1346 is adapted to temporarily store therein data generated by the CPU 1310 based on a manual operation performed against the operation button 1320. The data ROM 1348 pre-stores therein data or a program for allowing the mobile phone to perform a predetermined operation. The CPU 1310 is operable to read the data or the program to allow the mobile phone to perform the predetermined operation.

The memory card drive 1380 is adapted to accept a loading of a memory card 1382. The memory card drive 1380 is operable to read out data stored in the loaded memory card 1382, and send out the readout data to the CPU 1310. The memory card drive 1380 is also operable to reversely write data in a data storage area ensured in the memory card 1382.

The voice-signal processing circuit 1370 is operable to perform a processing for a signal to be used for the call or the like. The CPU 1310 and the voice-signal processing circuit 1370 may be integrated together.

The display unit 1350 is adapted, based on data output from the CPU 1310, to display an image defined by the data. For example, in cases where the flash memory 1344 stores therein data (e.g., URL) for accessing the information providing server 1230, the display unit 1350 displays the URL.

The LED 1376 is adapted to achieve a predetermined light-emitting action based on a signal from the CPU 1310. For example, the LED 1376 may be configured to be capable of indicating a plurality of colors. In this case, the LED 1376 is operable, based on data included in a signal output from the CPU 1310, to emit light with a color associated with the data.

The data communication IF 1378 is adapted to accept an attachment of a cable for data communication. The data communication IF 1378 is operable to send out a signal from the CPU 1310, to the cable attached thereto. The data communication IF 1378 is also operable to send out data received through the cable, to the CPU 1310.

The vibrator 1384 is adapted to generate vibration at a predetermined frequency based on a signal output from the CPU 1310. A fundamental operation of the mobile phone would be easily understood by those skilled in the art. Thus, its detailed description will be omitted.

The mobile phone 1200 further comprises a positioning signal-receiving antenna 1316 and a positioning signal-receiving front-end unit 1314.

The positioning signal-receiving antenna 1316 comprises the antenna 402, the RF front circuit 404, the down-converter 406 and the A/D converter 408, which have been described as components to be achieved by hardware in the position information providing apparatus 100 illustrated in FIG. 11. Further, the processing in each of the baseband processor 410 and the navigation processor 430 which has been described as a processing to be achieved by software in the position information providing apparatus 100, can be performed by a position-determination processing circuit 1312 on the CPU 1310 according to a program loaded from the flash memory 1344 onto the RAM 1346. In this configuration, the correlator unit 412 may also be configured to achieve the processing therein, based on hardware, instead of software. Further, the same hardware and software configurations as those in the position information providing apparatus 1000 illustrated in FIG. 14 may also be employed.

Figure 18:
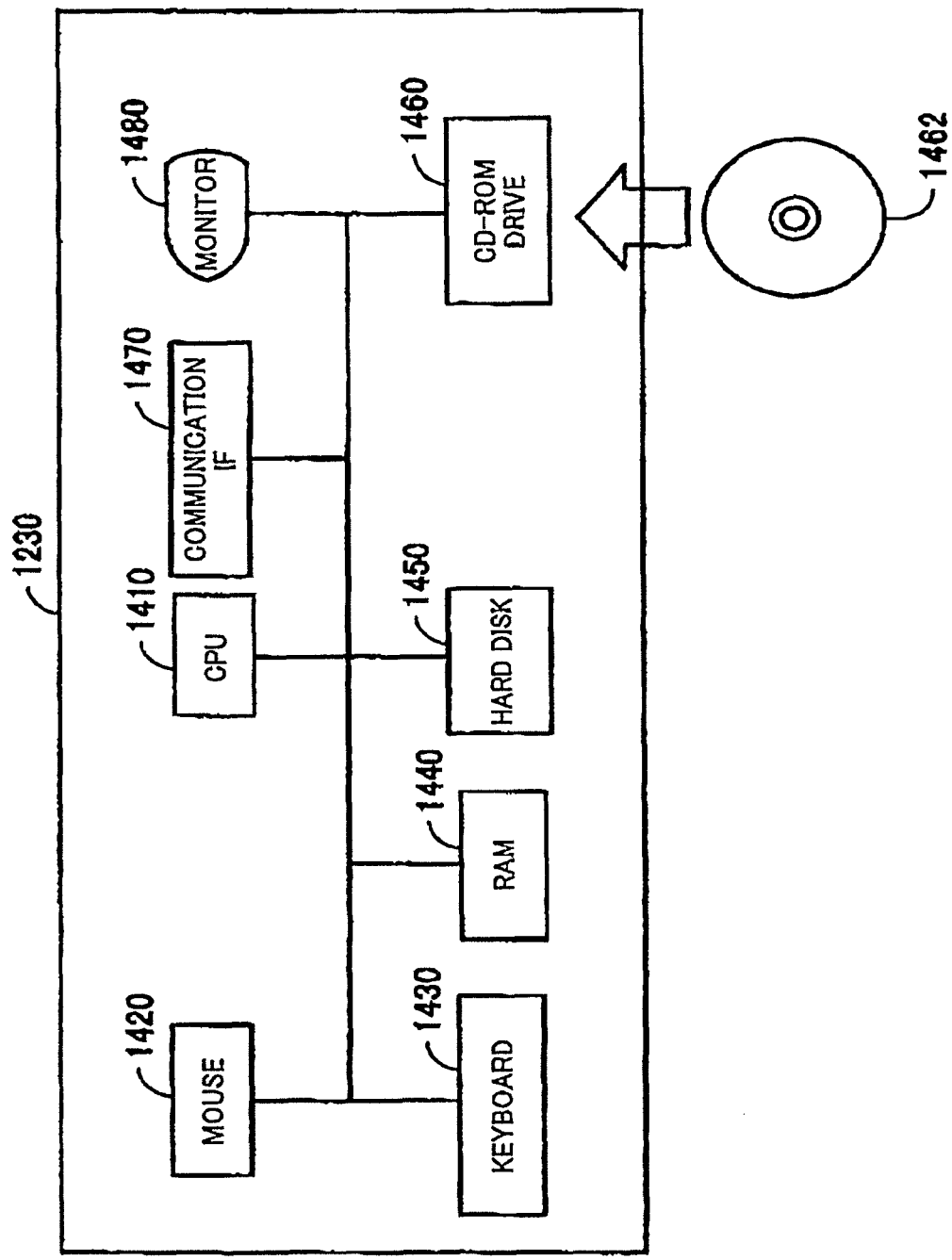
FIG. 18 is a block diagram showing a hardware configuration of an information providing server 1230 in the third embodiment.

With reference to FIG. 18, a specific configuration of the information providing server 1230 will be described. FIG. 18 is a block diagram showing a hardware configuration of the information providing server 1230. For example, the information providing server 1230 may be achieved by a conventional computer system.

As major hardware, the information providing server 1230 comprises: a CPU 1410; an input device including a mouse 1420 and a keyboard 1430 for accepting an input instructed by a user of the information providing server 1230; a RAM 1440 for temporarily storing therein data generated based on a program executed by the CPU 1410 or data input through the mouse 1420 or the keyboard 1430; a hard disk 1450 storing therein a large volume of data in a nonvolatile manner; a CD-ROM (Compact Disk-Read Only Memory) drive 1460; a monitor 1480; and a communication IF 1470. These hardware components are connected to each other by a data bus. A CD-ROM 1462 is attached to the CD-ROM drive 1460.

A processing in the computer system achieving the information providing server 1230 is achieved by the hardware or software to be executed by the CPU 1410. The software may be pre-stored in the hard disk 1450. Alternatively, the software may be a type which is stored in the CD-ROM 1462 or other data recording medium as a commercially-available program product. Alternatively, the software may be a type which is provided as a downloadable program product by an information provider connected to the Internet. The software is read out from the data recording medium by the CD-ROM drive or other data reading device, or downloaded via the communication IF 1470, and temporarily stored in the hard disk 1450. Then, the software is read out from the hard disk 1450 by the CPU 1410, and stored in the RAM 1440 in the form of an executable program. The CUP 1410 is operable to execute the program.

The hardware of the computer system achieving the information providing server 1230, illustrated in FIG. 18, is a commonly-used type. Thus, it can be said that a substantial part of the information providing server 1230 in the third embodiment is software stored in the RAM 1440, the hard disk 1450, the CD-ROM 1460 or other data recording medium, or software downloadable via a network. An operation of the hardware of the computer network is well known. Thus, its detailed description will be omitted.

The recording medium is not limited to the CD-ROM 1462 and the hard disk 1450, but may be a medium capable of fixedly carrying a program, such as a magnetic tape, a cassette tape, an optical disk (MO (Magnetic Optical Disk/MD (Mini Disk)/DVD (Digital Versatile Disk)), an IC (Integrated Circuit) card (including a memory card), an optical card, or a semiconductor memory including a mask ROM, an EEPROM and a flash ROM.

As used herein, the term "program" is not limited to a program executable directly by the CPU 1410, but includes a source program type, a compressed program, and an encrypted program.

With reference to FIG. 19, a structure of data to be held in the information providing server 1230 will be described. FIG. 19 is a diagram conceptually showing one mode of data storage in the hard disk 1450. The hard disk 1450 includes five areas 1510 to 1550 for storing data therein. Data stored in the areas 1510 to 1550 are associated with each other.

A record No. for identifying each data record stored in the hard disk 1450 is stored in the area 1510. A transmitter ID for identifying each of a plurality of transmitters for emitting a positioning signal is stored in the region 1520. For example, the transmitter ID may be a production number uniquely assigned to the transmitter by a manufacturer, or a number uniquely assigned to the transmitter by a manager of the system. Data (coordinate values) for indicating an installation location of the transmitter is stored in the area 1530. For example, this data may be stored in the hard disk every time a transmitter is installed. A specific name of the installation location of the transmitter is stored in the area 1540. For example, this data is used to allow a manager managing data stored in the hard disk (or service provider providing position information using the information providing server 1230) to recognize the installation location. Data indicative of a mail address of the installation location of the transmitter is stored in the area 1550. This data is used by the manager in the same manner as that in the data stored in the area 1540. The data stored in the areas 1510 to 1550 are associated with each other. Thus, if the transmitter ID is identified, a position coordinate, e.g., a coordinate of the installation location (area 1530), and a name of the installation location, can be identified. This makes it possible to determine a position of a sender of the transmitter ID by an area narrower than that covered by a base station.

A process of providing position information of an indoor transmitter by the information providing server 1230 is as follows. The mobile phone 1200 generates a packet data for requesting position information (hereinafter referred to as "request"), using a transmitter ID acquired based on a result of determination on the PRN-ID, and data (URL, etc.) for accessing the information providing server 1230. The mobile phone 1200 transmits the request to the base station 1240. This transmission is achieved by a conventional communication processing. In response to receiving the request, the base station 1240 transfers the request to information providing server 1230.

The information providing server 1230 detects reception of the request. Then, the CPU 1410 acquires the transmitter ID from the request, and performs search with respect to the hard disk 1450. More specifically, the CPU 1410 performs a matching processing for determining whether the acquired transmitter ID is matched with one of the transmitter IDs stored in the area 1520. As a result of the matching processing, if there is a transmitter ID identical to the transmitter ID included in the data transmitted from the mobile phone 1200, the CPU 1410 reads out the coordinate values (area 1530) associated with the transmitter ID, and generates packet data for returning position information to the mobile phone 1200. Specifically, the CPU 1410 generates the packet data with data having the coordinate values, while adding an address of the mobile phone 1200 to a header. The CPU 1410 transmits the packet data to the base station 1240 through the communication IF 1470.

In response to receiving the packet data transmitted from the information providing server 1230, the base station 1240 transfers the packet based on the address included in the data. The base data 1240 may store the received package data and a receiving time in a nonvolatile storage device (e.g., a hard disk unit). In this case, a record of position information acquisition of a user of the mobile phone 1200 is preserved, which makes it possible to figure out a movement route of the user.

In a situation where the mobile phone 1200 is located within a range where radio wavers from the base station 1240 are reachable, the mobile phone 1200 receives the packet transmitted from the base station 1240. When the user of the mobile phone 1200 performs a predefined operation for viewing the received data (e.g., an operation for viewing e-mail), the display unit 1350 displays the coordinate values of the transmitter. In this manner, the user can roughly know a current position. In this case, there is no need to register coordinate values on each transmitter to be installed in an indoor area, so that an installation location of a transmitter can be flexibly changed.

As above, in the position information providing system according to the third embodiment, a signal emitted from a transmitter installed on the ground includes data for identifying the transmitter (transmitter ID), depending on situations. This data is stored in a server apparatus for providing position information of the transmitter, in a manner associated with the position information. The mobile phone 1200 functioning as a position information providing apparatus transmits the transmitter ID to the server apparatus to acquire the position information. The use of this information providing technique makes it possible to eliminate a need for allowing position information of a transmitter to be held by the transmitter itself, and therefore facilitate a changing an installation position of a transmitter.

It should be understood that the above embodiments have been shown and described only by way of illustration, but the description is not meant to be construed in a limiting sense. Accordingly, the scope of the invention should be determined by the following claims and their legal equivalents, instead of the above description, and it is intended that all changes and modifications made within the scope are included therein.

INDUSTRIAL APPLICABILITY

The position information providing system of the present invention can be applied to a mobile phone having a positing function, and any other terminal capable of receiving a positioning signal, such as a portable positioning terminal and a portable monitoring terminal. Further, the transmitter of the present invention can be applied to a transmitter to be installed in an indoor area and any other transmitting device.

The invention claimed is:

1. A position information providing system capable of providing position information by use of a first positioning signal which is a spread spectrum signal from each of a plurality of satellites, comprising an indoor transmitter, and a position information providing apparatus, wherein:

the indoor transmitter includes a first storage unit which stores therein position data for identifying an installation location of the indoor transmitter, a generation unit for generating, as a spread spectrum signal, an second positioning signal which is a modulated signal having the position data, and a transmitting unit for transmitting the generated spread spectrum signal; and the position information providing apparatus includes a receiving unit for receiving a spread spectrum signal, a second storage unit which stores therein a plurality of code patterns related to the first and second positioning signals, an identifying unit for identifying one of the code patterns which corresponds to the spread spectrum signal received by the receiving unit, a determining unit for, based on a signal obtained by demodulating the received spread spectrum signal using the code pattern identified by the identifying unit, determining which of the first and second positioning signals is received, a position information-deriving unit for deriving position information of the position information providing apparatus, while switching between processing modes depending on a result of the determination, and an output unit for outputting the position information derived by the position information-deriving unit, and wherein:

the position data includes first data capable of identifying the indoor transmitter, and second data indicative of the installation location of the indoor transmitter; and the generation unit is operable to generate, as the second positioning signal, a first phase signal having the first data after being subjected to modulation, and a second phase signal having the second data after being subjected to modulation; wherein a clock of the indoor transmitter is independent from a clock of each of the satellites, and the position information-deriving unit is operable, (a) when the second positioning signal transmitted by the indoor transmitter which is one of a plurality of indoor transmitters, is received, to acquire the position data from the signal obtained by the demodulation, and, (b) when a plurality of the first positioning signals are received, to calculate the position information based on respective spread spectrum signals of the plurality of received first positioning signals, wherein the operations (a) and (b) above are switched independently by determining PRN-IDs of the first and second positioning signals.

2. The position information providing system as defined in claim 1, wherein:

the position information providing apparatus is adapted to be capable of communicating with a communication apparatus for providing position information associated with the first data; and the position information-deriving unit is operable, when the receiving unit receives the second positioning signal, to communicate with the communication apparatus based on the first data included in the first phase signal to acquire position information associated with the first data.

3. The position information providing system as defined in claim 2, wherein:

the second positioning signal shares a common format with the first positioning signal, and includes the position data in place of a navigation message included in the first positioning signal; and the position information-deriving unit of the position information providing apparatus includes a calculation unit which is operable, when a plurality of the first positioning signals are received, to calculate a position of the position information providing apparatus based on the navigation messages of the first positioning signals.

4. The position information providing system as defined in claim 1, wherein the indoor transmitter further includes a plurality of digital filters, and a selection unit for selecting one of the plurality of digital filters, and wherein the generation unit is operable to generate, as a spread spectrum signal, the second positioning signal having the position data, depending on a band defined by the digital filter selected by the selection unit.

5. The position information providing system as defined in claim 4, wherein the second positioning signal includes a first phase signal and a second phase signal, and wherein the first phase signal includes first data capable of identifying the indoor transmitter, and the second phase signal includes second data indicative of the installation location of the indoor transmitter, and wherein the generation unit is operable to perform modulation of the first phase signal and modulation of the second phase signal independently.

6. The position information providing system as defined in claim 1, wherein:

the position information-deriving unit is operable, when the receiving unit receives the second positioning signal, to extract the second data from the second phase signal; and the output unit is operable to display the installation location based on the extracted second data.

7. The position information providing system as defined in claim 6, wherein the second positioning signal includes a first phase signal and a second phase signal, and wherein the first phase signal includes first data capable of identifying the indoor transmitter, and the second phase signal includes second data indicative of the installation location of the indoor transmitter, and wherein the generation unit is operable to perform modulation of the first phase signal and modulation of the second phase signal independently.

8. The position information providing system as defined in claim 1, wherein the second positioning signal includes a first phase signal and a second phase signal, and wherein the first phase signal includes first data capable of identifying the indoor transmitter, and the second phase signal includes second data indicative of the installation location of the indoor transmitter, and wherein the generation unit is operable to perform modulation of the first phase signal and modulation of the second phase signal independently.

9. The position information providing system as defined in claim 8, wherein:

the first storage unit is adapted to store therein spread code data for spectral spreading; and the indoor transmitter further includes a data input unit adapted to accept an input of the spread code data, and write the accepted spread code data in the first storage unit, and wherein the generation unit is operable to generate the second positioning signal as a spread spectrum signal, based on the spread code data input from an outside of the indoor transmitter.

10. The position information providing system as defined in claim 1, wherein:

the first storage unit is adapted to store therein spread code data for spectral spreading; and the indoor transmitter further includes a data input unit adapted to accept an input of the spread code data, and write the accepted spread code data in the first storage unit, and wherein the generation unit is operable to generate the second positioning signal as a spread spectrum signal, based on the spread code data input from an outside of the indoor transmitter.

11. The position information providing system as defined in claim 1, wherein the generation unit is a logic circuit which is programmable according to firmware supplied from the outside.

12. The position information providing system as defined in claim 1, wherein:
the second positioning signal shares a common format with the first positioning signal, and includes the position data in place of a navigation message included in the first positioning signal; and
the position information-deriving unit of the position information providing apparatus includes a calculation unit which is operable, when a plurality of the first positioning signals are received, to calculate a position of the position information providing apparatus based on the navigation messages of the first positioning signals.

13. The position information providing system as defined in claim 12, wherein:
the position data is configured to identify a position of the indoor transmitter only by itself; and
the output unit is operable to output the position information derived from the position data in the form of an image indicative of a determined position.

14. The position information providing system as defined in claim 1, wherein:
the position data is configured to identify a position of the indoor transmitter only by itself; and
the output unit is operable to output the position information derived from the position data in the form of an image indicative of a determined position.

15. An indoor transmitter capable of providing position information using a first positioning signal which is a spread spectrum signal from each of a plurality of satellites, comprising:
a first storage unit which stores therein position data for identifying an installation location of the indoor transmitter;
a generation unit for generating, as a spread spectrum signal, an second positioning signal which is a modulated signal having the position data; and
a transmitting unit for transmitting the generated spread spectrum signal,
wherein:
the position data includes first data capable of identifying the indoor transmitter, and second data indicative of the installation location of the indoor transmitter; and
the generation unit is operable to generate, as the second positioning signal, a first phase signal having the first data after being subjected to modulation, and a second phase signal having the second data after being subjected to modulation;
wherein a clock of the indoor transmitter is independent from a clock of each of the satellites.

16. The indoor transmitter as defined in claim 15, which further comprises a plurality of digital filters and a selection unit for selecting one of the plurality of digital filters, and wherein the generation unit is operable to generate, as a spread spectrum signal, the second positioning signal having the position data, depending on a band defined by the digital filter selected by the selection unit.

17. The indoor transmitter as defined in claim 15 wherein:
the first storage unit is adapted to store therein spread code data for spectral spreading; and
the indoor transmitter further includes a data input unit adapted to accept an input of the spread code data, and write the accepted spread code data in the first storage unit,
and wherein the generation unit is operable to generate the second positioning signal as a spread spectrum signal, based on the spread code data input from an outside of the indoor transmitter.

18. The indoor transmitter as defined in claim 15 wherein the generation unit is a logic circuit which is programmable according to firmware supplied from the outside.

19. A method of providing position information by use of a first positioning signal which is a spread spectrum signal from each of a plurality of satellites, comprising:
the step of generating an second positioning signal which is modulated, as a spread spectrum signal, based on position data for identifying an installation location of an indoor transmitter;
the step of transmitting the generated spread spectrum signal;
the step of receiving a spread spectrum signal;
the step of identifying, based on a plurality of code patterns related to the first and second positioning signals, one of the code patterns which corresponds to the received spread spectrum signal;
the step of determining, based on a signal obtained by demodulating the received spread spectrum signal using the identified code pattern, which of the first and second positioning signals is received;
the step of deriving position information, while switching between processing modes depending on a result of the determination; and
the step of outputting the derived position information,
wherein:
the position data includes first data capable of identifying the indoor transmitter, and second data indicative of the installation location of the indoor transmitter;
the step of generating includes the sub-step of generating, as the second positioning signal, a first phase signal having the first data after being subjected to modulation, and a second phase signal having the second data after being subjected to modulation; and
a clock of the indoor transmitter is independent from a clock of each of the satellites.

* * * * *

UNITED STATES PATENT AND TRADEMARK OFFICE
CERTIFICATE OF CORRECTION

| | | |
|---|---|---|
| PATENT NO. | : 8,174,439 B2 | Page 1 of 1 |
| APPLICATION NO. | : 12/681543 | |
| DATED | : May 8, 2012 | |
| INVENTOR(S) | : Hideyuki Torimoto et al. | |

It is certified that error appears in the above-identified patent and that said Letters Patent is hereby corrected as shown below:

Col. 39, claim 15, line 2, "using a first positioning signal" should read -- using a second positioning signal having the same data format as a first positioning signal --.

Signed and Sealed this
Sixth Day of November, 2012

David J. Kappos
*Director of the United States Patent and Trademark Office*

UNITED STATES PATENT AND TRADEMARK OFFICE
CERTIFICATE OF CORRECTION

PATENT NO.        : 8,174,439 B2
APPLICATION NO.   : 12/681543
DATED             : May 8, 2012
INVENTOR(S)       : Hideyuki Torimoto et al.

Page 1 of 1

It is certified that error appears in the above-identified patent and that said Letters Patent is hereby corrected as shown below:

Column 39, line 28 (claim 15, line 2) "using a first positioning signal" should read -- using a second positioning signal having the same data format as a first positioning signal --.

This certificate supersedes the Certificate of Correction issued November 6, 2012.

Signed and Sealed this
Eleventh Day of December, 2012

David J. Kappos
*Director of the United States Patent and Trademark Office*